United States Patent
Minegishi

(10) Patent No.: US 8,317,649 B2
(45) Date of Patent: Nov. 27, 2012

(54) OUTPUT GEAR-EQUIPPED REDUCTION DEVICE AND METHOD OF ASSEMBLING THE SAME

(75) Inventor: Kiyoji Minegishi, Obu (JP)

(73) Assignee: Sumitomo Heavy Industries, Ltd., Tokyo (JP)

( * ) Notice: Subject to any disclaimer, the term of this patent is extended or adjusted under 35 U.S.C. 154(b) by 285 days.

(21) Appl. No.: 12/707,844

(22) Filed: Feb. 18, 2010

(65) Prior Publication Data

US 2010/0206110 A1 Aug. 19, 2010

Related U.S. Application Data

(63) Continuation of application No. PCT/JP2008/064464, filed on Aug. 12, 2008.

(30) Foreign Application Priority Data

Aug. 20, 2007 (JP) ................................ 2007-213960

(51) Int. Cl.
*F16H 57/08* (2006.01)
(52) U.S. Cl. ....................................................... 475/331
(58) Field of Classification Search .................. 475/162, 475/330, 331, 337; 384/456, 548, 549, 564
See application file for complete search history.

(56) References Cited

U.S. PATENT DOCUMENTS

| 319,973 | A | * | 6/1885 | Gray | 105/224.05 |
| 5,528,978 | A | * | 6/1996 | Forster | 92/140 |
| 5,779,020 | A | * | 7/1998 | Hargarten | 192/105 R |
| 6,293,704 | B1 | * | 9/2001 | Gradu | 384/557 |

FOREIGN PATENT DOCUMENTS

| CN | 87215919 | 9/1988 |
| DE | 42 06 086 A1 | 9/1993 |
| DE | 195 12 976 A1 | 10/1996 |
| JP | 49-20565 | 2/1974 |
| JP | 50-35553 | 4/1975 |
| JP | 52-156876 | 11/1977 |
| JP | 63-158321 | 7/1988 |
| JP | 3-11127 | 2/1991 |
| JP | 6-35640 | 5/1994 |
| JP | 2005-069245 | 3/2005 |
| JP | 2006-283983 | 10/2006 |

OTHER PUBLICATIONS

European Search Report application No. 08792397.5 dated Mar. 9, 2011.

* cited by examiner

*Primary Examiner* — Justin Holmes
(74) *Attorney, Agent, or Firm* — Squire Sanders (US) LLP

(57) ABSTRACT

The output gear-equipped reduction device has an output flange for taking out rotation reduced by a reduction mechanism, an output shaft provided on the output flange and having a smaller diameter than the output flange, and an output gear provided on the output shaft and having an addendum circle greater than the diameter of the output shaft. The output flange, the output shaft, and the output gear are integrally formed as an output flange section, an output shaft section, and an output gear section of a single output member in that order in the axial direction with the above-stated dimensional relationship maintained. The integral output member is supported at the output shaft section by a casing via bearing means.

21 Claims, 27 Drawing Sheets

US 8,317,649 B2

OUTPUT GEAR-EQUIPPED REDUCTION DEVICE AND METHOD OF ASSEMBLING THE SAME

CROSS-REFERENCE RELATED APPLICATIONS

This is a continuation application under 35 USC §120 of PCT International Patent Application No. PCT/JP2008/064464, which was filed on Aug. 12, 2008. The disclosure of the prior application is hereby incorporated by reference herein in it's entirety. The parent application claims priority of Japanese patent application 2007-213960, filed on Aug. 20, 2007.

BACKGROUND OF THE INVENTION

1. Field of the Invention

The present invention relates to an output gear-equipped reduction device and a method of assembling the same.

2. Description of Related Art

Japanese Unexamined Patent Application Publication No. 2006-283983 discloses an output gear-equipped reduction device including a casing, a reduction mechanism housed within the casing, an output flange for taking out rotation reduced by a reduction mechanism, an output shaft provided on the output flange and having a smaller diameter than the output flange, and an output gear (output pinion) provided on the output shaft and having an addendum circle greater than the diameter of the output shaft. This kind of output gear-equipped reduction device is widely used, for example, for driving of turning devices in construction machinery, such as diggers.

The output gear-equipped reduction device disclosed in Japanese Unexamined Patent Application Publication No. 2006-283983 is shown in FIGS. 26 and 27. This output gear-equipped reduction device 10 includes an input shaft 12, a first pinion 14, a gear 16, and four eccentric shafts 18 which rotate via a second pinion 17, and is configured such that external gears 22A and 22B eccentrically oscillate on the radial inside of an internal gear 24 by eccentric bodies 20A and 20B provided on eccentric shafts 18, respectively.

A pair of first and second carriers 26A and 26B which takes out rotation components of the external gears 22A and 22B is arranged on both axial sides of the external gears 22A and 22B and is integrated by bolts 27. Among them, the second carrier 26B functions as an output flange so that power is transmitted to the output shaft 28 as it is. A "lump" of the first and second carrier 26A and 26B and the output shaft 28 is rotatably supported on a casing 36 by an angular contact ball bearing 32 and a taper roller bearing 34.

The output shaft 28 is mounted with an output gear (output pinion) 38 via a spline 40. This output gear 38 is a large gear which has an addendum circle having a greater diameter d2 than the external diameter d1 of the output shaft 28 and which has a face width L1 of ½ or more of the external diameter d1 of the output shaft 28.

Although the output gear-equipped reduction device 10 which has such an output gear 38 is frequently used for turning driving devices, etc. of diggers and wind turbine generator facilities as mentioned above, a very powerful radial load or thrust load may be applied to the output gear 38 by the nature of the reduction device. The output gear 38 has a face width L1 of ½ or more of the external diameter d1 of the output shaft 30 in order to cope with this powerful load in the radial direction.

Additionally, the regulation of axial movement the output gear 38 to the output shaft 28 is performed by the following configurations so as to cope with this powerful load in the thrust direction. That is, the output gear 38 is formed with stepped portions 38A and 38B. A locking ring 42 which engages with one stepped portion 38A is fitted until the locking ring comes into contact with on a stepped portion 28A formed in the output shaft 28. The locking ring 42 function as a member which specifies the axial positions of three of the output shafts 28, the taper roller bearing 34, and the output gear 38. Moreover, a locking plate 44 which engages with the other stepped portion 38B of the output gear 38 is fixed to the output shaft 28 via bolts 46. Axial movement of the output gear 38 is constrained with respect to the output shaft 28 as the output gear is sandwiched from both axial sides by the locking plate 44 and the locking ring 42.

However, in the related-art structure, in order to reliably fix to the output shaft 28 the output gear 38 to which powerful radial power load or thrust power load is applied, much time and effort, such as fitting the locking ring 42 into the output shaft 28 and fixing the locking plate 44 to the output shaft 28 via bolts 46, and many accessories were required.

Additionally, although the output shaft 28, the taper roller bearing 34, the casing 36, the output gear 38, the locking ring 42, and the locking plate 44 are respectively separate members, there is a problem in that these members are assembled in axial positions which are mutually specified, and substantial time is also taken for shim adjustment, etc. during assembling.

Moreover, in order to secure required strength, there is also a problem in that it is necessary to use large-sized parts which have respective appropriate strength for accessory members, such as the locking ring 42, the locking plate 44, and the bolts 46 for such fixation, and the whole weight is also apt to become heavy.

SUMMARY OF THE INVENTION

It is desirable to provide an output gear-equipped reduction device which uses a reduced number of parts, has high strength, and can be assembled with ease and high accuracy.

According to an embodiment of the invention, there is provided an output gear-equipped reduction device including: a casing; a reduction mechanism housed within the casing; an output flange for outputting rotation reduced by the reduction mechanism; an output shaft provided on the output flange and having a smaller diameter than the output flange; and an output gear provided on the output shaft and having an addendum circle greater than the diameter of the output shaft. The output flange, the output shaft, and the output gear are integrally formed as an output flange section, an output shaft section, and an output gear section of a single output member in that order in the axial direction with the above-stated dimensional relationship maintained, and the integral output member is supported at the output shaft section by the casing via bearing means.

In the embodiment of the invention, the output flange, the output shaft, and the output gear having a greater diameter than the output shaft are integrally formed as an output flange section, an output shaft section, and an output gear section of "a single output member" in that order in the axial direction.

This technical meaning is as follows.

In this kind of structure, a reducer itself including the output shaft is quite large-sized, and the output gear is also very large-sized. Additionally, in a turning device, etc. of a construction machine that is the most important application of the invention, a mating meshing internal gear is still larger, and is required to be fixed to a main body of the construction machine from the viewpoint of its function. Therefore, the internal gear is practically standardized throughout the industry, and there is a situation that module, pitch circles, etc. cannot be freely changed.

Meanwhile, when a shaft and a gear (pinion) are integrated together, generally, it is a normal course of manufacture and assembly to make a design so that an addendum circle of the gear (pinion) has a smaller diameter than the external diameter of the shaft. However, when it is intended to form the output shaft so as to have a greater diameter than the addendum circle of this output gear in a state where the specification and items of the output gear including a module, a pitch diameter, etc. are determined, the output shaft becomes much more large-sized, and a casing which supports the output shaft will become still larger.

However, the embodiment of the invention has adopted a configuration in which the output flange, the output shaft, and the output gear having a greater diameter than the output shaft are daringly integrated as an output flange section, an output shaft section, and an output gear section of one output member with the dimensional relationship maintained, and the integral output member is supported by the casing via the bearing means at the portion of the output shaft section, i.e., at a small diameter portion sandwiched between the output flange section and the output gear section.

By this configuration, all of the radial mutual engagement structure and axial movement regulating structure of the output flange, the output shaft, and the output gear become unnecessary, the number of parts is reduced, and assembling man-hours are reduced.

Additionally, since the positioning between the output member and casing which has been integrated together can be performed via, for example, the bearing means provided in the output shaft section, the positioning adjustment of the output member itself with respect to the casing can also be simplified.

Additionally, irrespective of whether the three pieces are integrated together, the output shaft section is daringly configured so as to maintain a state where the output shaft section has a smaller diameter than the output gear (without depending on a normal integrating technique), and the bearing means is arranged on the small diameter output shaft section to support the output member. Therefore, the miniaturization and weight saving of the whole reduction device can also be maintained without increasing the external diameter of the casing of the reducer.

Moreover, if the dimensions of the output flange, the output shaft, and the output gear are the same as those of the related-art output flange, output shaft, and output gear by the "integration," strength can be further increased compared to the reduction device composed of the separate members.

According to another embodiment of the invention, there is also provided a method of assembling an output gear-equipped reduction device including a casing, a reduction mechanism housed within the casing, an output flange for outputting rotation reduced by the reduction mechanism, an output shaft provided on the output flange and having a smaller diameter than the output flange, and an output gear provided on the output shaft and having an addendum circle greater than the diameter of the output shaft. The method includes forming an output member in which the output flange, the output shaft, and the output gear are integrally provided as an output flange section, an output shaft section, and an output gear section in that order in the axial direction with the above-stated dimensional relationship maintained; forming an inner periphery of the casing with recesses housing rolling elements for rotationally supporting the output shaft section and set to the position and size such that the teeth of the output gear section can pass through the recesses in the axial direction; holding the rolling elements on the outer periphery of the output shaft section; and making the outer peripheries of the teeth of the output gear section pass through the recesses in the axial direction to incorporate the casing, and fitting the rolling elements held on the outer periphery of the output shaft section into the recesses.

Additionally, according to still another embodiment of the invention, there is also provided a method of assembling an output gear-equipped reduction device including a casing, a reduction mechanism housed within the casing, an output flange for outputting rotation reduced by the reduction mechanism, an output shaft provided on the output flange and having a smaller diameter than the output flange, and an output gear provided on the output shaft and having an addendum circle greater than the diameter of the output shaft. The method includes forming an output member in which the output flange, the output shaft, and the output gear are integrally provided as an output flange section, an output shaft section, and an output gear section in that order in the axial direction with the above-stated dimensional relationship maintained; forming an inner periphery of the casing with recesses housing rolling elements for rotationally supporting the output shaft section and set to the position and size such that the teeth of the output gear section can pass through the recesses in the axial direction; making the outer peripheries of the teeth of the output gear section pass through the recesses in the axial direction to incorporate the casing, thereby securing an axial space between a side surface of the casing and a side surface of the output gear such that the rolling elements can be housed in the recesses; and fitting the rolling elements into the recesses formed in the casing utilizing the axial space.

According to the embodiments of the invention, it is possible to obtain an output gear-equipped reduction device which has high strength, uses a reduced number of parts, and can be assembled with ease and high accuracy.

BRIEF DESCRIPTION OF THE DRAWINGS

FIG. 7A is a front view, and FIG. 7B is a sectional view taken along the line VIIB-VIIB of FIG. 7A.

FIG. 8A is a front view, and FIG. 8B is a sectional view taken along the line VIIIB-VIIIB of FIG. 8A.

FIG. 10A is a front view, and FIG. 10B is a side view.

DETAILED DESCRIPTION OF THE INVENTION

Hereinafter, an example of an embodiment of the invention will be described in detail with reference to the drawings.

Figure 1:
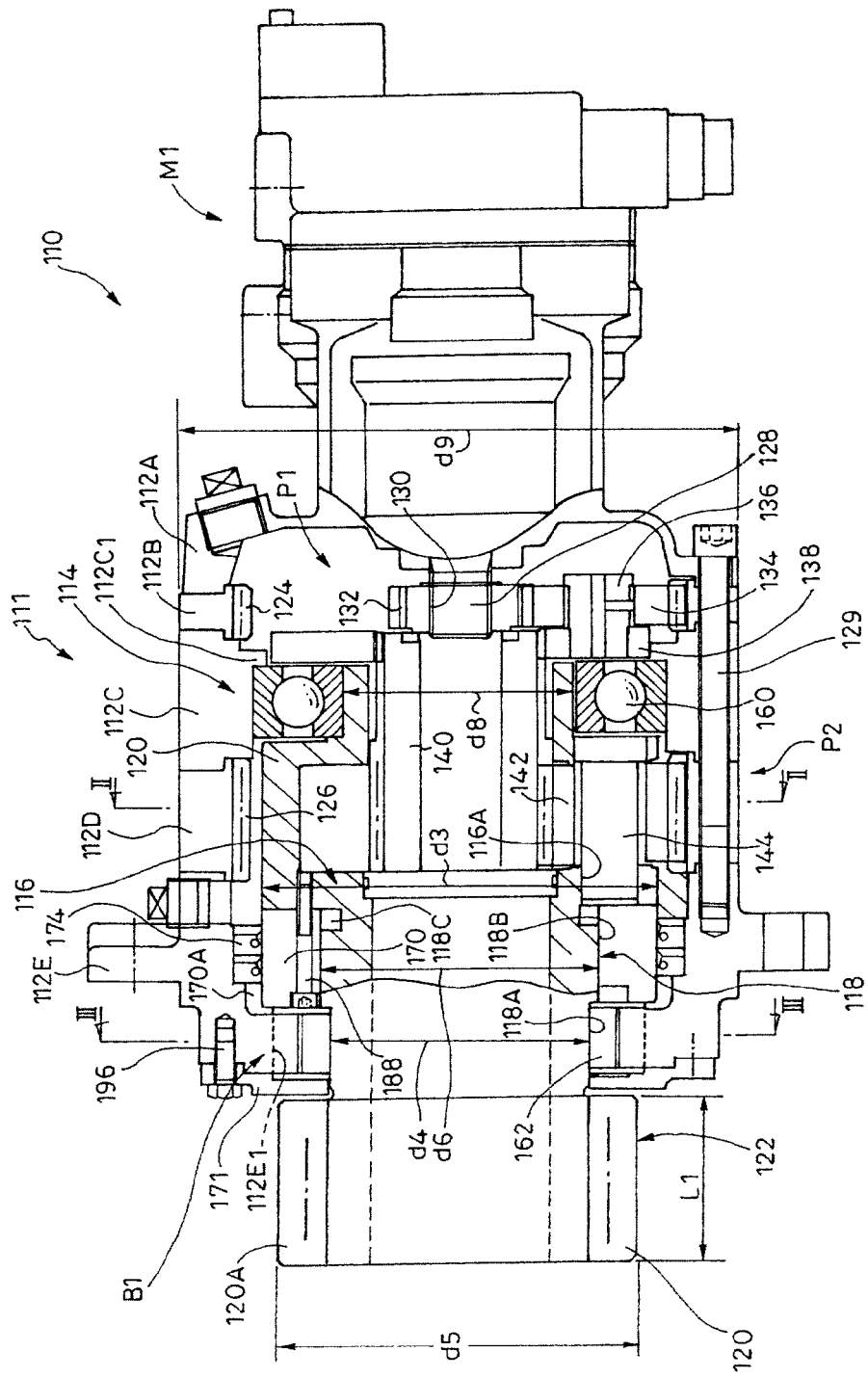
FIG. 1 is a longitudinal sectional view of an output gear-equipped reduction device according to an example of an embodiment of the invention.
Figure 2:
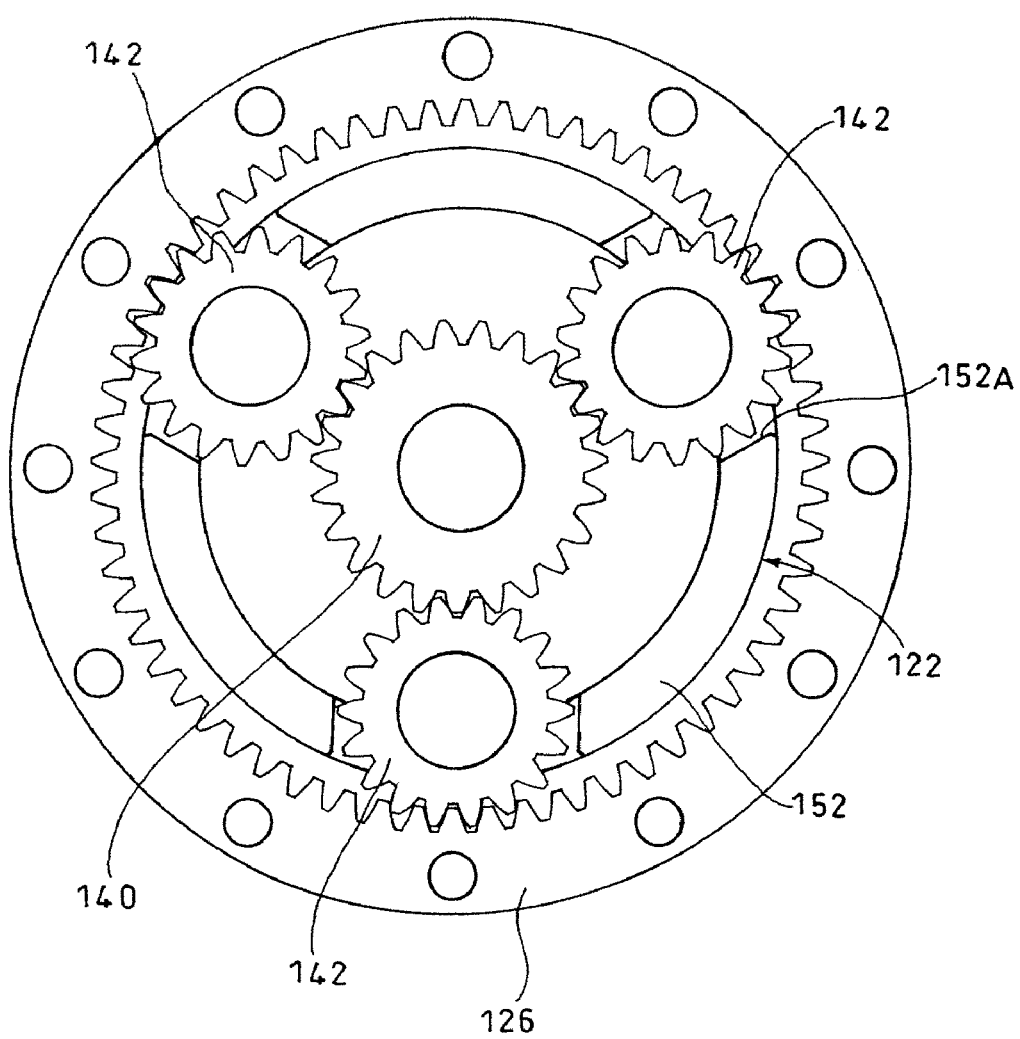
FIG. 2 is a sectional view taken along the line II-II of FIG. 1.
Figure 3:
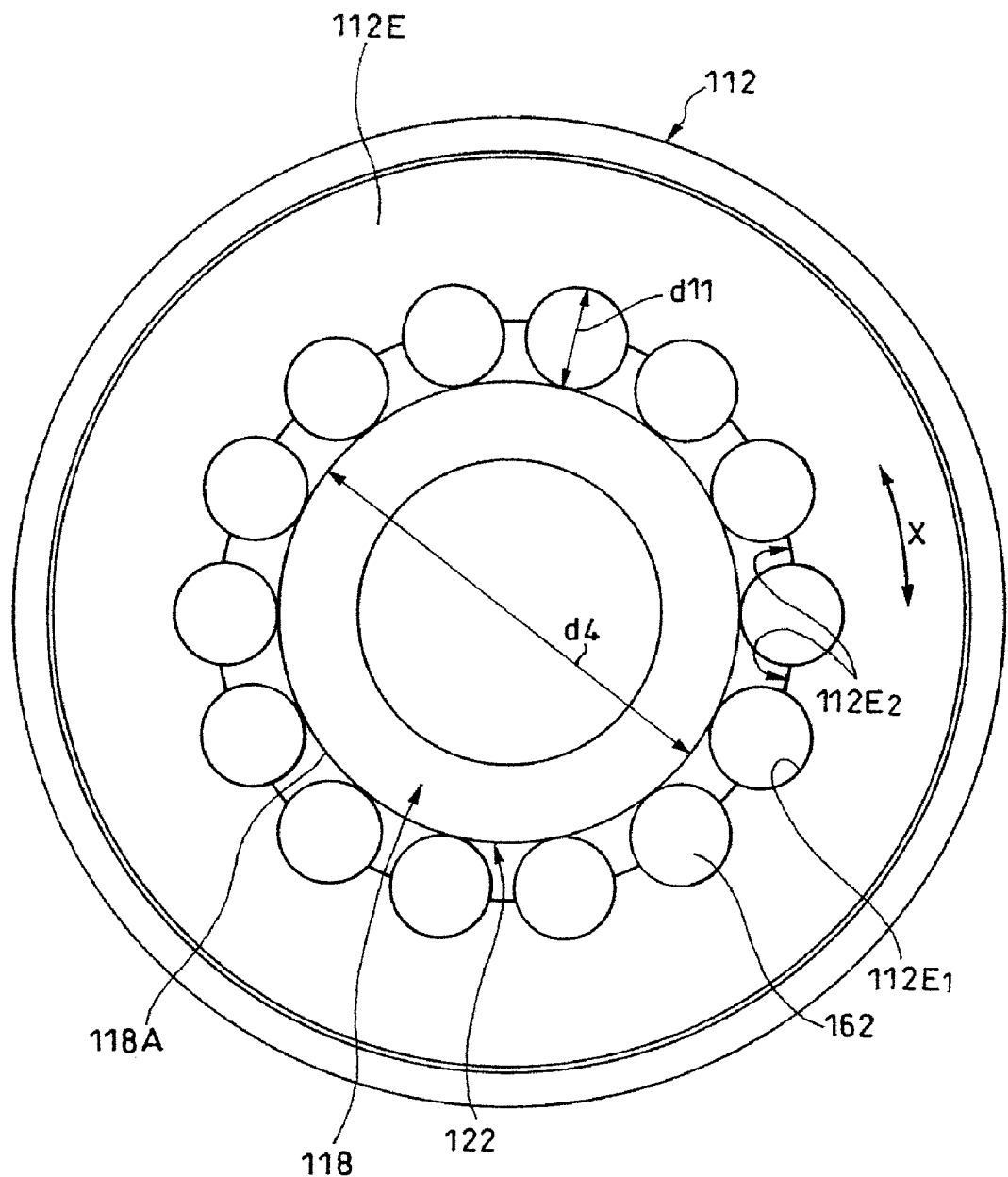
FIG. 3 is a sectional view taken along the line III-III of FIG. 1.

FIG. 1 is a longitudinal sectional view of an output gear-equipped reduction device 110 according to the example of the embodiment of the invention, FIG. 2, and FIG. 3 are sectional views taken along the line II-II and line III-III, respectively, of FIG. 1. Additionally, FIG. 4 is a whole schematic perspective view of a digger to which the above output gear-equipped reduction device is applied.

Figure 4:
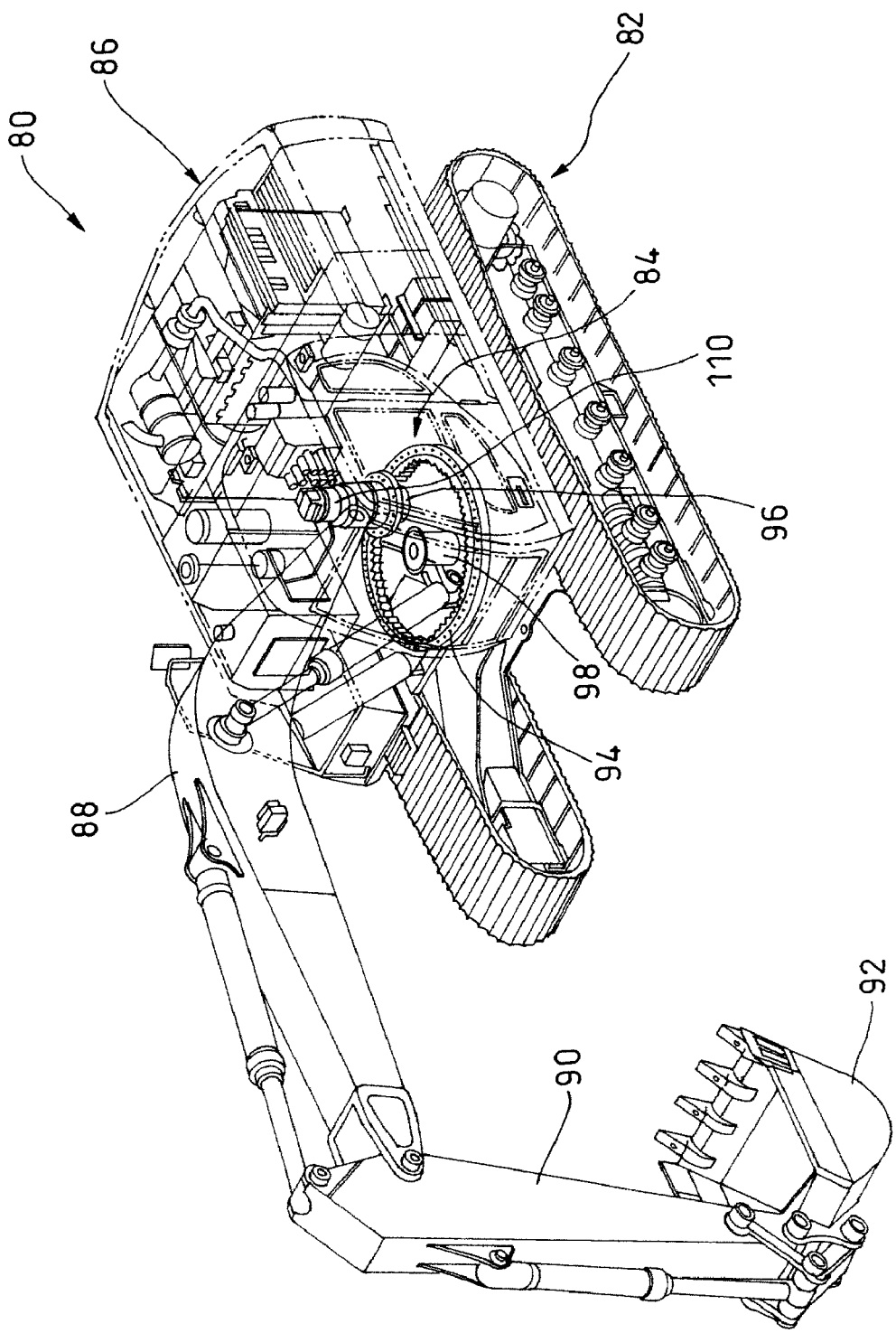
FIG. 4 is a whole schematic perspective view of a digger to which the above output gear-equipped reduction device is applied.

First, referring to FIG. 4, in a digger 80, a car body 86 including a driver's seat 84 is turnably placed above a traveling caterpillar (crawler) 82. A boom 88, an arm 90, and an attachment 92 are installed in a cantilevered state from the car body 86. The car body 86 has an internal gear 94 fixed to the base side thereof, and an output gear section 120 of an output member 122 (which will be described later) of the output gear-equipped reduction device 110 according to this embodiment internally meshes with the internal gear 94 so that the car body 86 can turn around an axial center 98.

With reference to FIGS. 1 to 3, the output gear-equipped reduction device 110 will be described.

The output gear-equipped reduction device 110 includes a hydraulic motor M1 and a simple planetary reducer 111.

Figure 5:
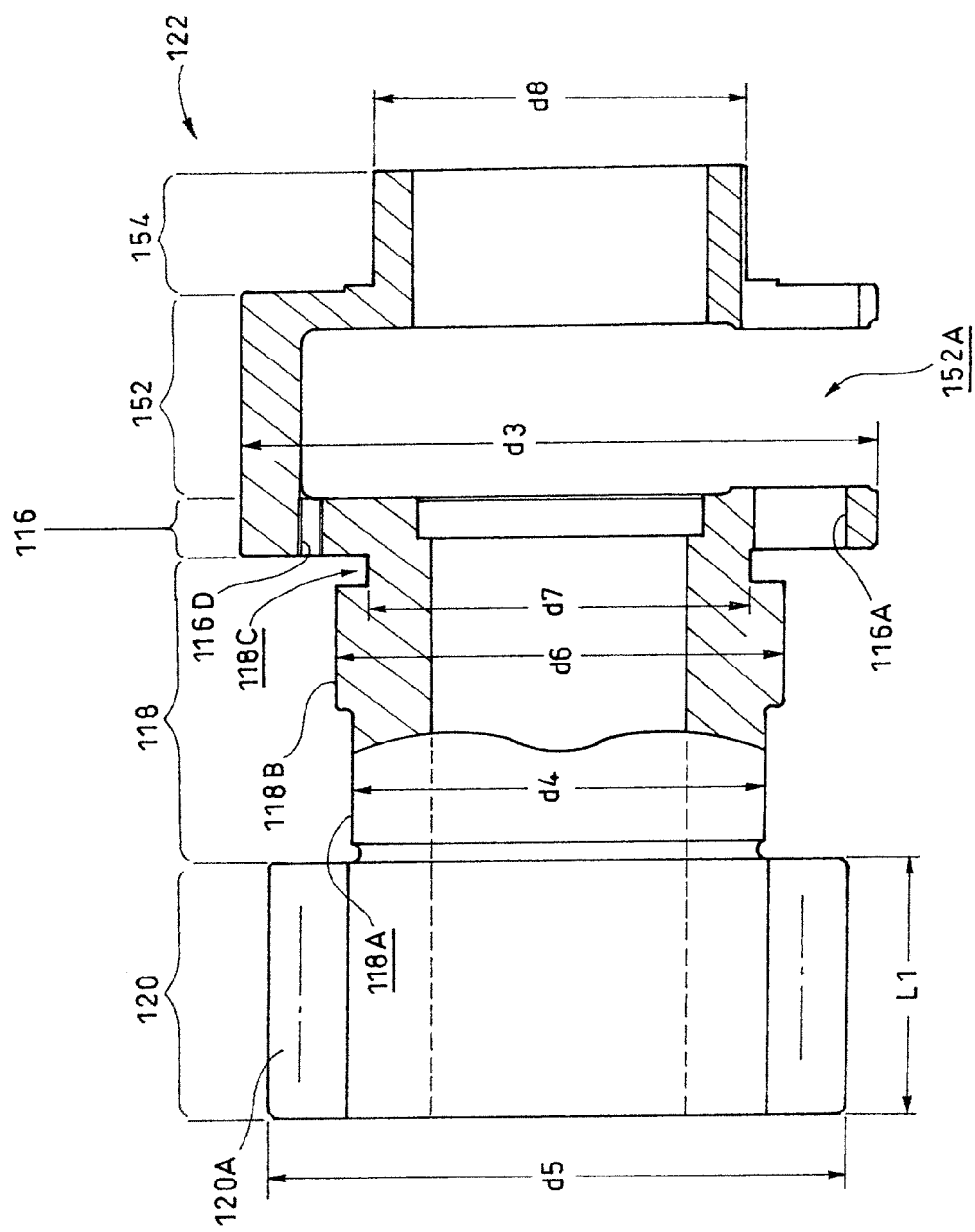
FIG. 5 is a partially fractured front view showing an output member of the above embodiment as a single body.

The reducer 111 includes a casing 112, a reduction mechanism 114 housed within the casing 112, and an output member 122 which takes out rotation reduced by the reduction mechanism 114. In the output member 122, as the shape of a single body of the output member is shown in FIG. 5, an output flange section 116, an output shaft section 118 having a smaller diameter than the output flange section 116, and an output gear section 120 having an addendum circle greater than the diameter of the output shaft section 118 are integrally formed as one member in that order in the axial direction.

The integral output member 122 is supported at the output shaft section 118 by the casing 112 via bearing means B1. The casing 112 is composed mainly of a first casing body 112A which also serves as a motor cover, a second casing body 112B integrated with a first-stage internal gear (which will be described later) 124, a third casing body 112C which supports one end of the output member 122, a fourth casing body 112D integrated with a subsequent-stage internal gear (which will be described later) 126, and a fifth casing body 112E which is located on the most output side, and is coupled by bolts 129.

Hereinafter, a more concrete configuration will be described in detail.

The motor M1 has a portion of the casing thereof integrated with the first casing body 112A of the casing 112 of the output gear-equipped reduction device 110, and is coupled to the output gear-equipped reduction device 110 via the aforementioned bolts 129. An output shaft (motor shaft) 128 of the motor M1 is provided with a sun gear 132 of a first-stage simple planetary gear mechanism P1 via a spline 130. The first-stage simple planetary gear mechanism P1 includes this sun gear 132, a planetary gear 134 which revolves around the sun gear 132, and the internal gear 124 with which the planetary gear 134 internally meshes (or which is integrated with the second casing body 112B). The planetary gear 134 is rotatably supported with respect to a carrier pin 136 via a metal bearing fixed to the carrier pin 136. The carrier pin 136 is press-fitted into and fixed to a first-stage output plate 138, and gives the rotation synchronized with the revolution component of the planetary gear 134 around the sun gear 132 to the first-stage output plate 138.

The first-stage output plate 138 meshes with one end of a sun gear 140 of a subsequent-stage simple planetary gear mechanism P2 at a uniform speed. The subsequent-stage simple planetary gear mechanism P2 includes the sun gear 140, the planetary gear 142 which externally meshes with the other end of the sun gear 140, and the internal gear 126 with which the planetary gear 142 internally meshes (or which is integrated with the fourth casing body 112D). The planetary gear 142 is supported by a carrier pin 144. The carrier pin 144 is press-fitted into and fixed to a carrier pin hole 116A of the output flange section 116 of the output member 122, and gives the rotation synchronized with the revolution component of the planetary gear 142 around the sun gear 140 to the output flange section 116.

As shown in FIG. 2, three planetary gears 142 of the subsequent-stage simple planetary gear mechanism P2 are provided in this embodiment. The sun gear 140 meshes with the first-stage output plate 138 of the first-stage simple planetary gear mechanism P1 at a uniform speed at one end thereof, and meshes with the three planetary gears 142 on the other end thereof so that the radial positioning thereof is made.

Here, a configuration around the output member 122 will be described in detail.

Referring back to FIG. 5, the output member 122 integrally has the output flange section 116, the output shaft section 118, and the output gear section 120 in that order in the axial direction. A supporting cylindrical section 154 extends and is integrally formed via a connecting section 152 from the output flange section 116.

As mentioned above, three carrier pin holes 116A into which the carrier pins 144 of the planetary gear 142 of the subsequent-stage simple planetary gear mechanism P2 are press-fitted, respectively, are formed in the output flange section 116 of the output member 122 so as to pass therethrough. The external diameter of the output flange section 116 is d3.

A portion of the outer periphery of the output shaft section 118 of the output member 122 is formed with a transfer surface 118A which is allowed to function as an inner ring of a roller (rolling elements) 162 of the bearing means B1. Meanwhile, the fifth casing body 112E of the casing 112 functions as an outer ring of the bearing means B1. That is, as shown in FIG. 3, the fifth casing body 112E has a plurality of recesses (circular-arc transfer surface) 112E1 which houses rollers 162 that are rolling elements of the bearing means B1 at the inner periphery thereof, and an intermediate portion 112E2 between the recesses 112E1 constitutes a retainer which regulates the movement of the rollers 162 in a circumferential direction X of the output shaft section. In addition, reference numeral 171 of FIG. 1 is a presser plate (which will be described later) which has a function of the retainer which regulates the axial movement of the rollers 162.

Eventually, the bearing means B1 in this embodiment is configured by a structure in which (a portion of) the output shaft section 118 of the output member 122 is used as an inner ring, a portion of the fifth casing body 112E is used as an outer ring, the rollers 162 are used as rolling elements, the recesses 112E1 of the fifth casing body 112E are used as the transfer surface of the rollers 162, and the intermediate portion 112E2 between the recesses 112E1 and the presser plate 171 are used as a retainer of the rollers 162.

Here, when the external diameter d4 of a supporting portion (transfer surface 118A in this embodiment) by the bearing means B1 of the output shaft section 118 is defined as the external diameter of this output shaft section 118, the external diameter d4 of the output shaft section 118 is set to be smaller than the external diameter d3 of the output flange section 116 (d4<d3). Additionally, a collar (which will be described later) 170 is mounted on the outer periphery of an outer peripheral portion 118B which is machined with an external diameter d6 (d6>d4) adjacent to the transfer surface 118A of the output shaft section 118. An outer peripheral portion 170A of the collar 170 is used as a contacting surface of an oil seal 174, and the inside and outside of the reduction mechanism 114 are sealed by the oil seal 174. Additionally, a groove 118C formed at the outer peripheral portion of the output shaft section 118 with a bottom diameter d7 is provided to secure the slip-out of a tool when the outer peripheral portion 118B is machined, and d7<d6 is satisfied.

The outer periphery of the output gear section 120 of the output member 122 is formed with external teeth 120A of which the number of teeth is 14. Gear specification, such as the module of the external teeth 120A can be made the same as that of the output gear (38) in the previous related-art example. The diameter d5 of the addendum circle of the external teeth 120A is greater than the external diameter d4 of (transfer surface 118A of) the output shaft section 118 (d5>d4). In addition, ½ or more of the external diameter d4 of the output shaft section 118 is secured as the face width L1 of the output gear section 120.

The connecting section 152 of the output member 122 extends towards the side opposite to the output shaft section from the output flange section 116, and houses the subsequent-stage simple planetary gear mechanism P2 therein. Here, in order to minimize the external diameter (=the external diameter of the output flange section 116) d3, as shown in FIG. 2, the connecting section 152 is formed a window 152A for insertion of the planetary gear 142, and a portion of the planetary gear 142 is housed in such a manner that the planetary gear has projected outward from the window 152A. In addition, after the planetary gear 142 has been inserted, the carrier pin 144 is press-fitted into and fixed to the carrier pin hole 116A from the axial direction.

The supporting cylindrical section 154 of the output member 122 is formed with the size of the external diameter d8 slightly smaller (naturally a diameter smaller than the external diameter d3 of the output flange section 116) than the external diameter d4 of the transfer surface 118A of the output shaft section 118. In this supporting cylindrical section 154, one end of the output member 122 is rotatably supported by the casing 112 (the third casing body 112C) via a ball bearing 160.

The output member 122 configured as described above is supported at both ends thereof by the ball bearing 160 and bearing means B1 which are arranged at the supporting cylindrical section 154 and output shaft section 118 which are made to have small diameters. In addition, reference numeral 112C1 represents a projection provided on the third casing body 112C in order to constrain the movement of the ball bearing 160 to the right of the drawing. Since the diameter d8 of the supporting cylindrical section 154 is kept small, the external diameter d9 of the casing 112 is maintained at a minimum dimension irrespective of whether the external diameter d3 of the output flange section 116 is a large diameter.

Figure 6:
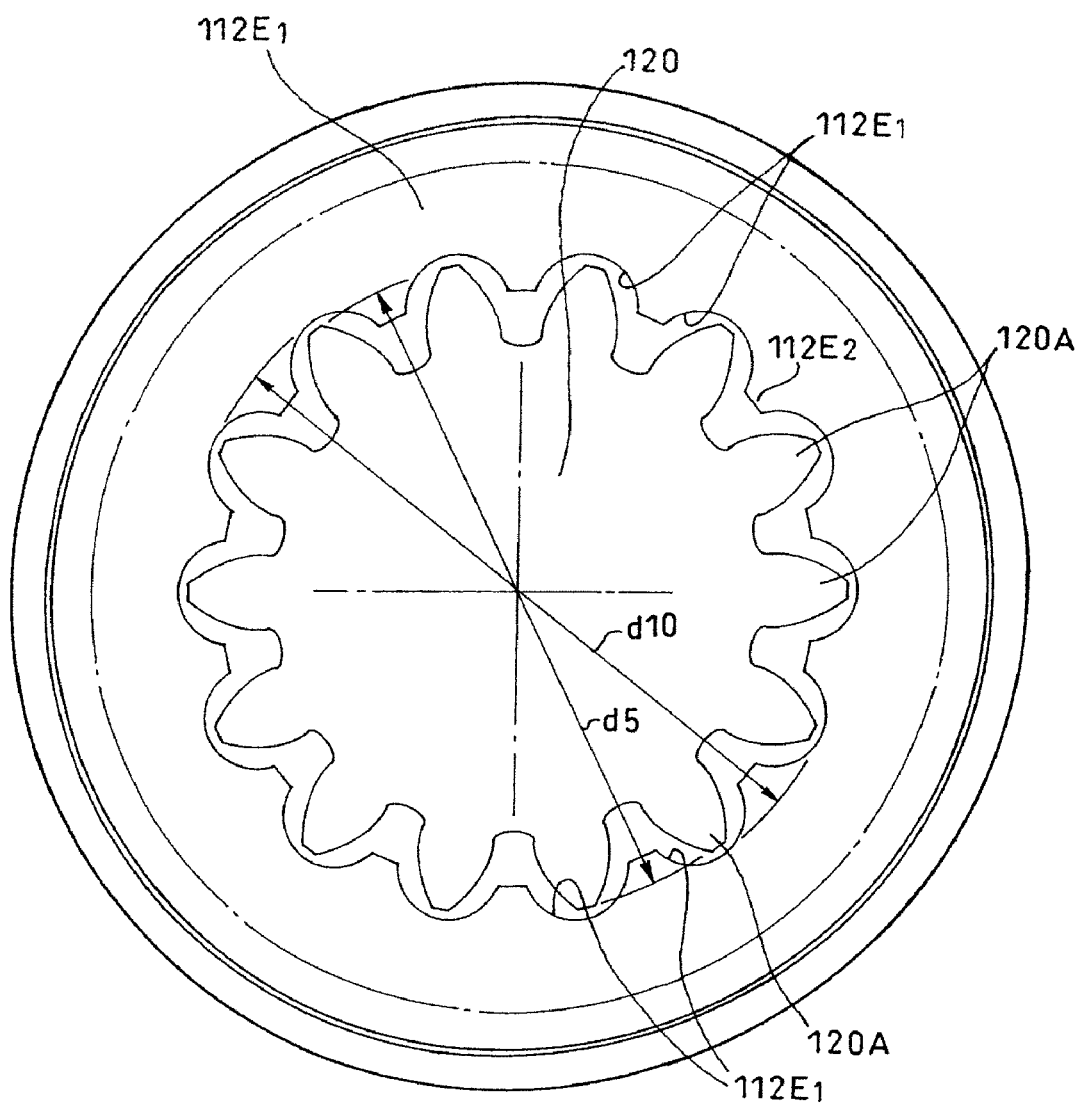
FIG. 6 is a side view showing the relationship in position and size between an output gear section of the output member and a recess of a casing.

The relationship in position and size between the external teeth 120A of the output gear section 120 of the output member 122, and the recesses 112E1 formed at the inner periphery of the fifth casing body 112E is shown in FIG. 6.

The outer periphery of the output gear section 120 is formed with the external teeth 120A of which the number of teeth is 14. As mentioned above, the diameter d5 of the addendum circle of the external teeth 120A is greater than the external diameter d4 of (transfer surface 118A of) the output shaft section 118. However, in this embodiment, bearing support at the small-diameter output shaft section 118 is enabled by performing the following contrivance. That is, the number and formation position of the external teeth 120A of the output gear section 120 completely coincide with the number and formation position of the recesses 112E1 of the fifth casing body 112E. Moreover, since the diameter d10 of an envelope circle which connects the bottoms of the recesses 112E1 together is greater than the diameter d5 of the addendum circle of the external teeth 120A of the output gear section 120 (d10>d5: refer to FIG. 6), the output gear section 120 can pass through the recesses 112E1 in a state where the rollers 162 are not housed (the fifth casing body 112E can be assembled from the axial direction irrespective of the existence of the output gear section 120). If a point of view is changed, it can be said that the diameter d11 and number of the rollers 162 as described in FIG. 3 are set so that this dimensional relationship is obtained.

Figure 7:
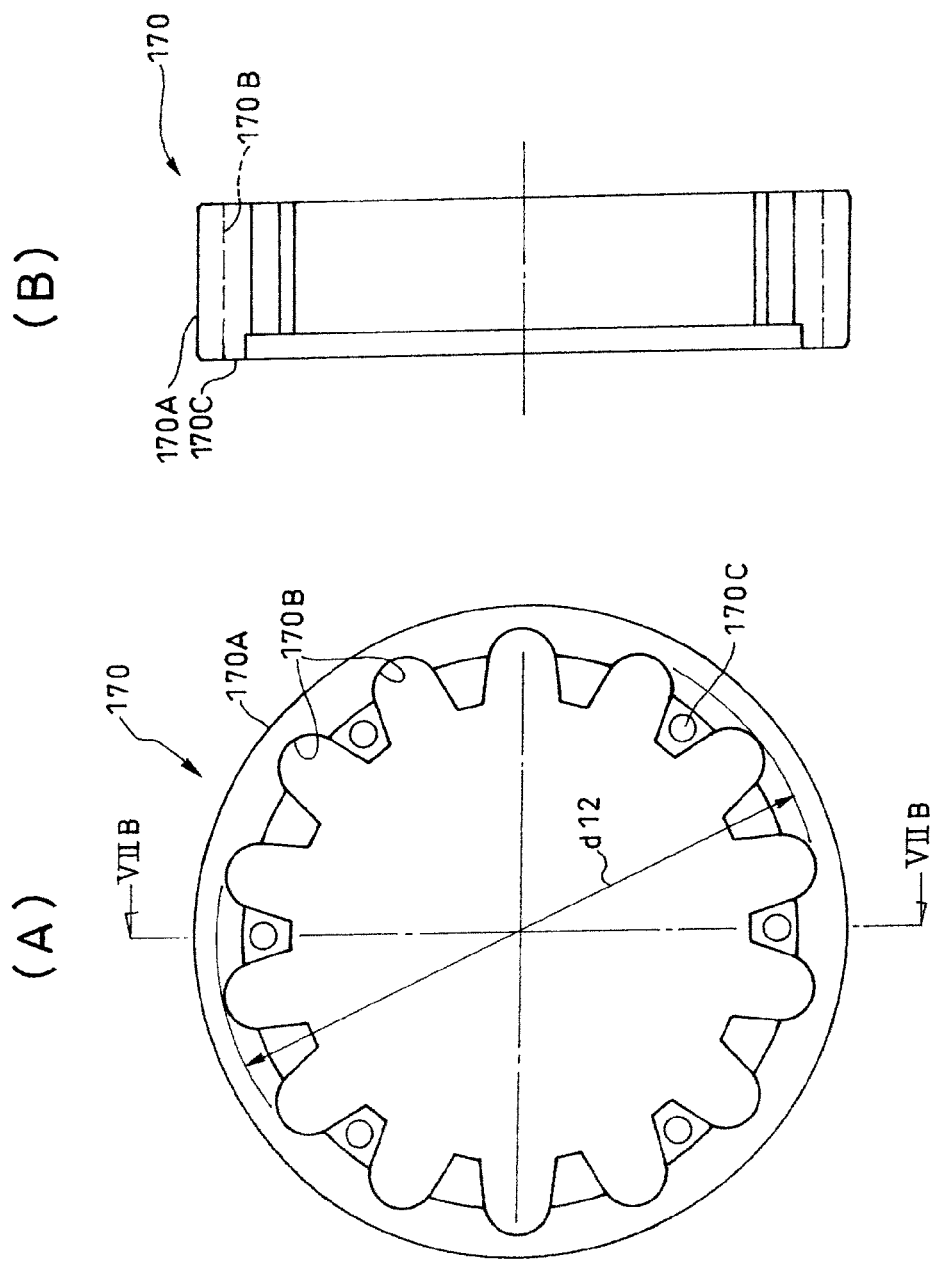
FIGS. 7A and 7B are sectional views showing a collar of the above embodiment as a single body.

Meanwhile, as shown in FIG. 7, the collar 170 includes U-shaped cross-sectional grooves 170B which have a slightly greater envelope circle diameter d12 than the diameter d5 of the addendum circle of the external teeth 120A of the output gear section 120 (d12>d5). For this reason, the collar 170 is able to transverse the external teeth 120A of the output gear section 120 in the axial direction so as to straddle the external teeth at the portions of the grooves 170B. In addition, the collar 170 is formed with bolt holes 170C for assembling the collar 170 to bolt holes 116D of the output flange section 116 via bolts 188.

Figure 8:
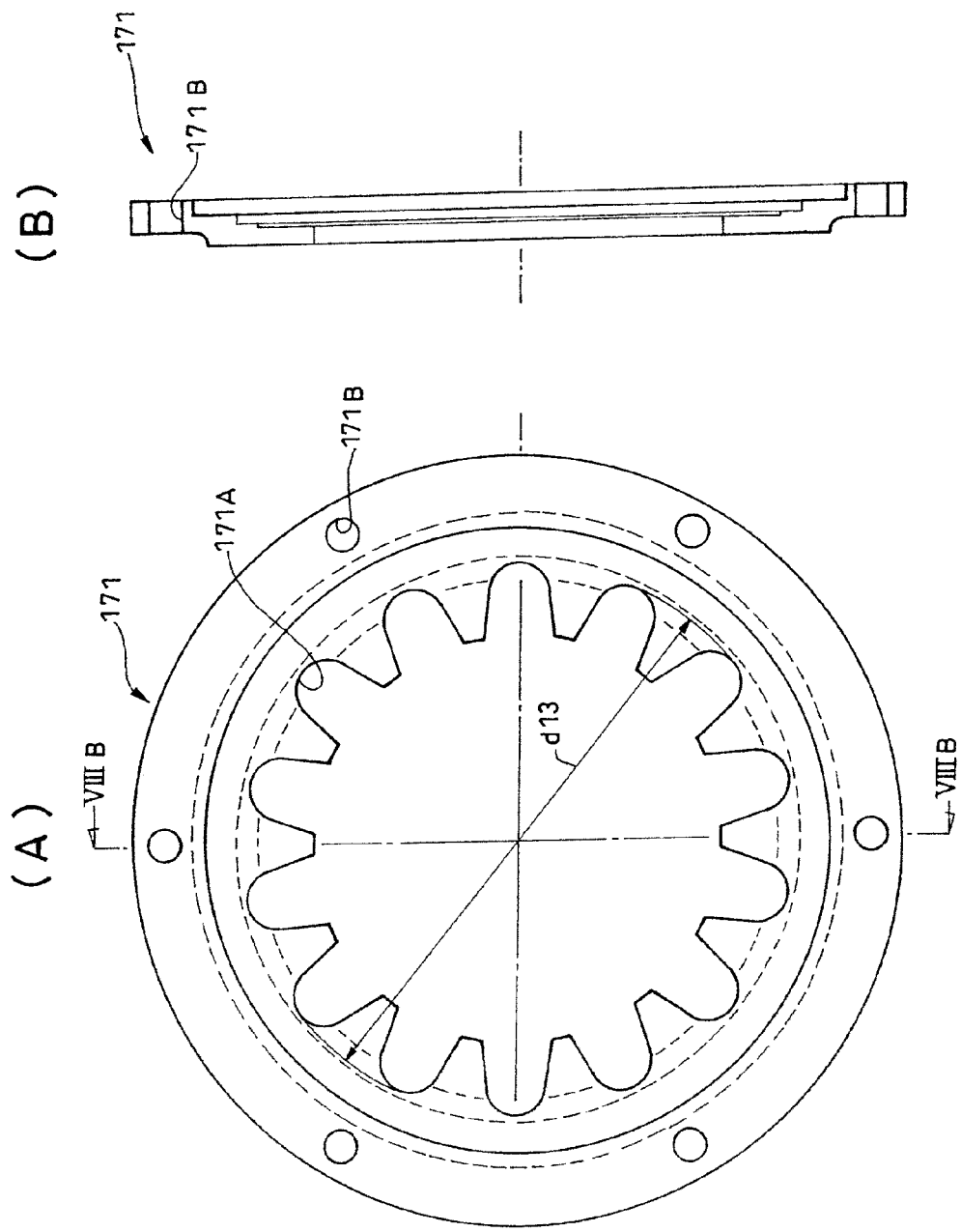
FIGS. 8A and 8B are sectional views showing a presser plate of the above embodiment as a single body.

Moreover, as shown in FIG. 8, the presser plate 171 of the rollers 162 is also formed in a shape having U-shaped cross-sectional grooves 171A which have a slightly greater envelope circle diameter d13 than the external teeth 120A of the output gear section 120 (d13>d5). That is, the presser plate 171 is also able to transverse the external teeth 120A of the output gear section 120 in the axial direction so as to straddle the external teeth at the portions of the grooves 171A. In addition, the presser plate 171 is formed with bolt holes 171B for assembling the presser plate 171 to the fifth casing body 112E via bolts 196.

Next, a method of assembling respective members around the output member 122 of the output gear-equipped reduction device 110 will be described.

After the ball bearing 160 is incorporated into the third casing body 112C, the supporting cylindrical section 154 of the output member 122 is fitted in a state where the subsequent-stage simple planetary gear mechanism P2 is housed within the connecting section 152. In addition, the simple planetary gear mechanism P1 is incorporated from the side of the motor M1, i.e., the right side of FIG. 1. At this time, the ball bearing 160 may be incorporated into the supporting cylindrical section 154 from the side of the motor M1.

Next, the collar 170 is incorporated from the left side of FIG. 1 so as to straddle the external teeth 120A of the output gear section 120, and is fixed to the output flange section 116 via the bolts 188.

Thereafter, an oil seal 174 is arranged at the outer peripheral portion 170A of the collar 170, and the fifth casing body 112E is incorporated from the left side of FIG. 1 so as to straddle the external teeth 176 of the output gear section 154. At this stage, the first to the fifth casings 112A to 112E are connected and fixed to each other via the bolts 129. In addition, the oil seal 174 arranged between the outer peripheral portion 170A of the collar 170, and the fifth casing body 112E may be arranged in advance at the outer peripheral portion 170A of the collar 170, and may be incorporated in advance before the fifth casing body 112E and the fourth casing body 112F are connected together.

Figure 9:
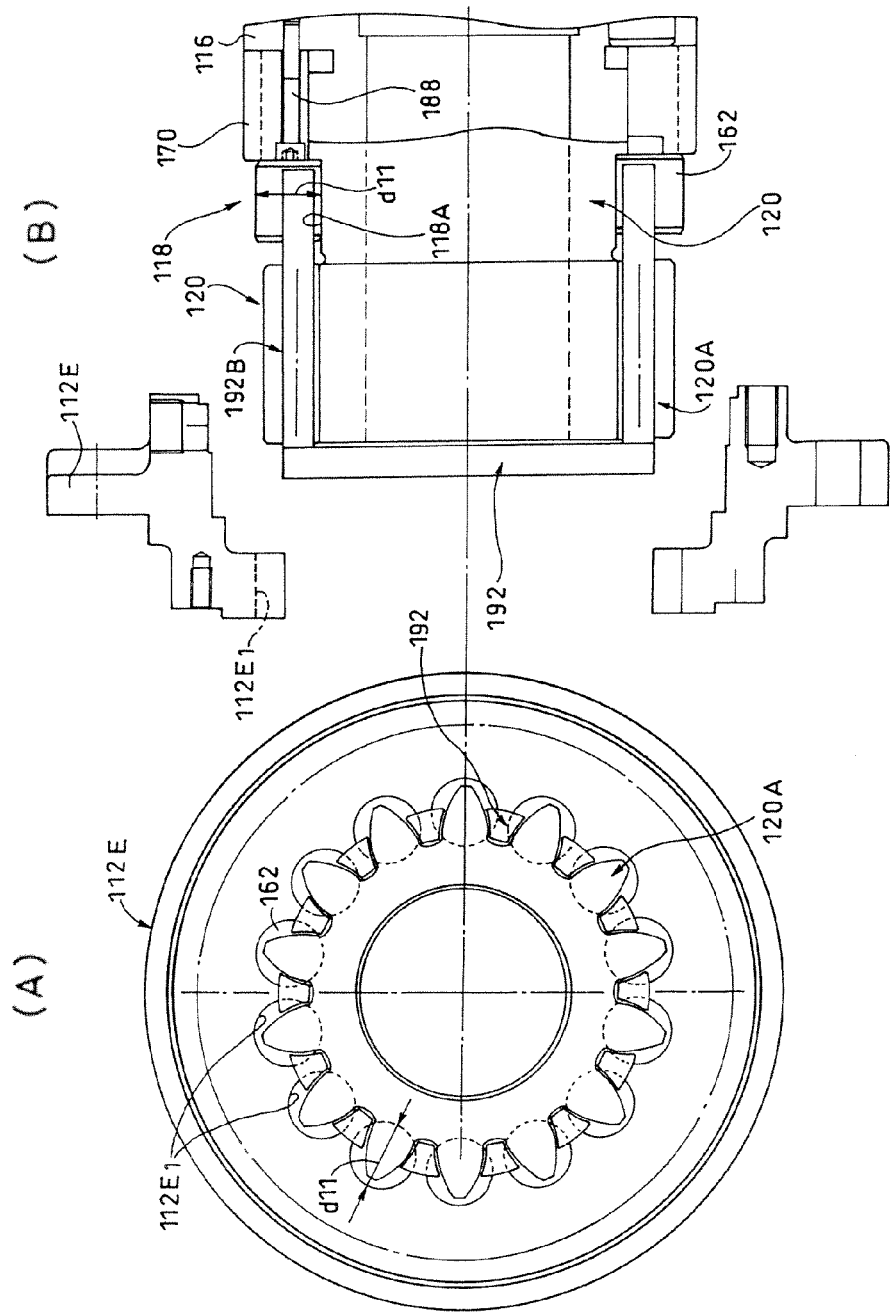
FIGS. 9A and 9B are explanatory views showing a procedure when the above output member is assembled.
Figure 10:
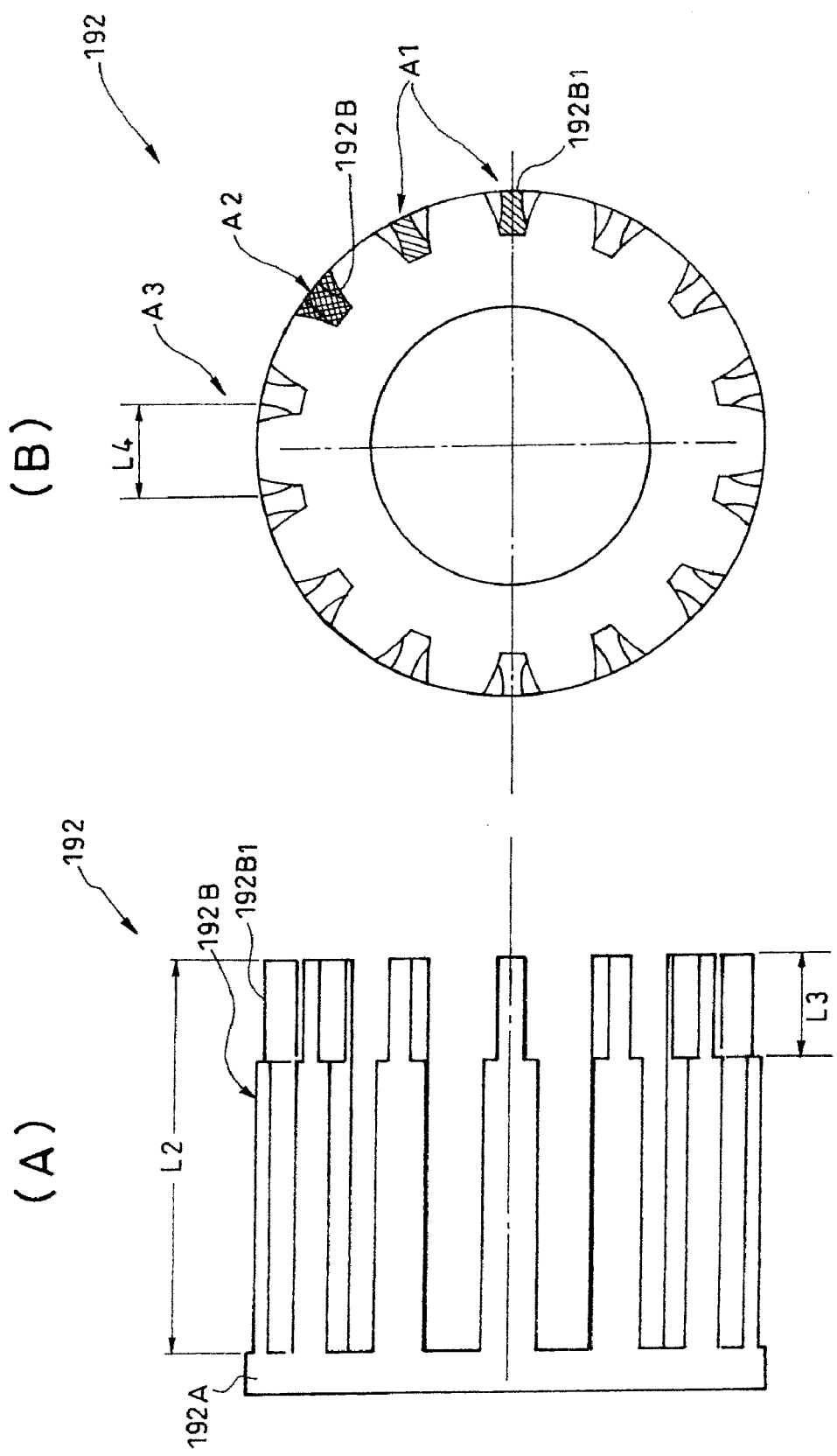
FIGS. 10A and 10B show a holding jig used to hold rollers in the above process.

Meanwhile, as shown in FIGS. 9A and 9B, the holding jig 192 is made to face the transfer surface 118A of the output shaft section 118 from between the external teeth 120A of the output gear section 120, and is made to hold the rollers 162 on the transfer surface 118A. As shown in FIGS. 10A and 10B, the holding jig 192 has a shape such that fourteen comb teeth 192B with a length L2 are formed so as to project from a ring-shaped bottom 192A, and tips 192B1 of the comb teeth 192B are formed in a cross-sectional shape which hold the rollers 162 so that the rollers 162 can be held. In addition, the axial length of the tips 192B1 is set to L3, and the portion of reference numeral A1 shown by single hatching of FIG. 10B shows the cross-sectional shape in the tips 192B. Additionally, the portion of reference numeral A2 shown by double hatching shows a cross-sectional shape other than the tips 192B1 of the comb teeth 192B. Moreover, the distance L4 between the tips 192B1 shown by reference numeral A3 is set to a dimension slightly smaller than the diameter d11 of the rollers 162 (L4<d11). For this reason, the holding jig 192 can hold the rollers 162 between the respective comb teeth 192B, as the tips 192B1 thereof elastically deform slightly.

Figure 11:
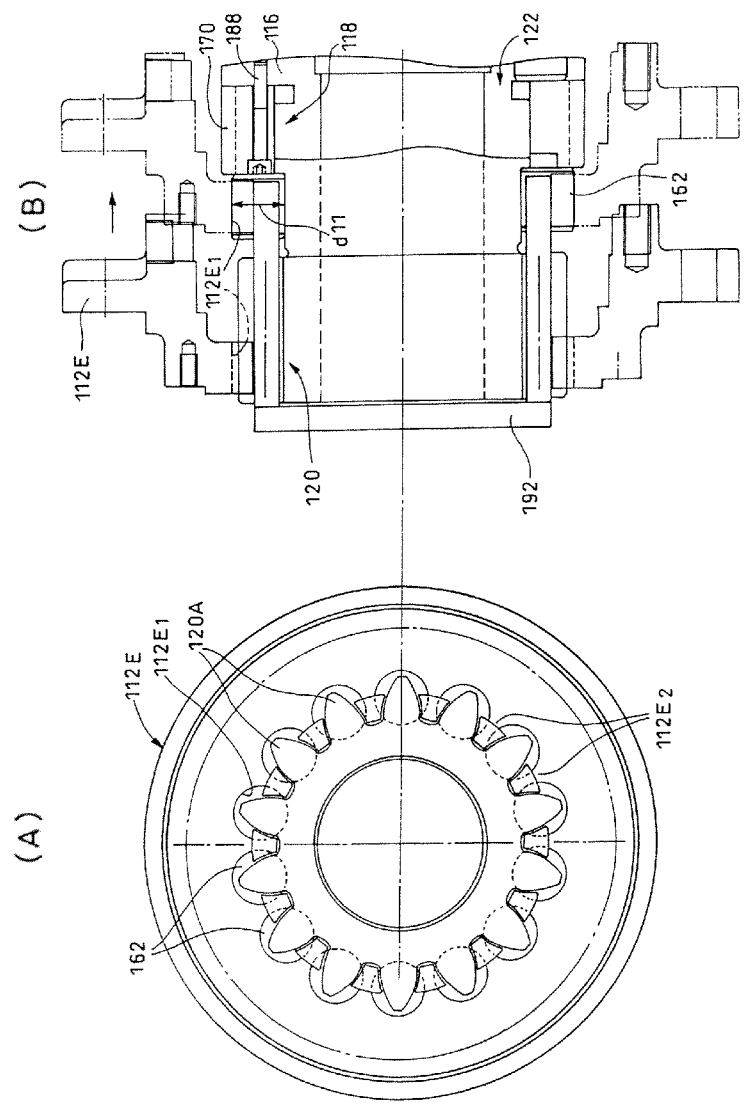
FIGS. 11A and 11B are explanatory views showing the next step of the procedure in the above process.
Figure 12:
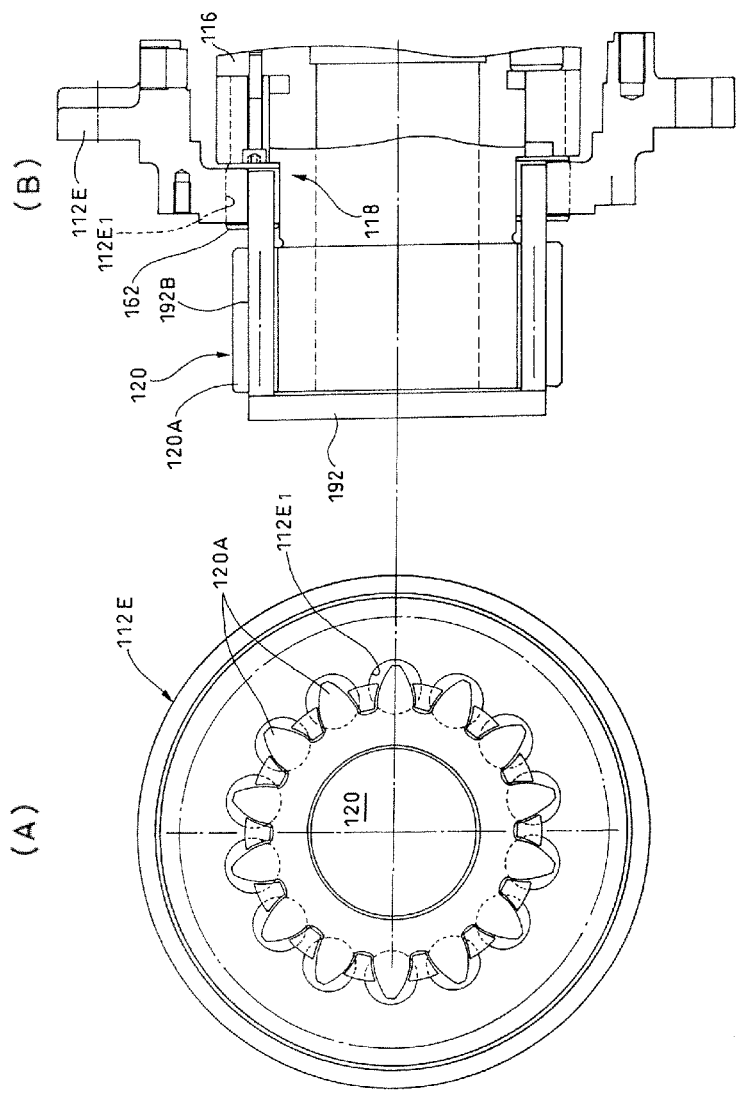
FIGS. 12A and 12B are explanatory views showing a further next step of the procedure in the above process.

Referring back to FIGS. 9A and 9B, FIGS. 9A and 9B show a state where the fifth casing body 112E is incorporated from the left side of FIG. 1 in a state where the rollers 162 are arranged and held on the transfer surface 118A of the output shaft section 118 via such a holding jig 192. Additionally, FIGS. 11A and 11B show an aspect where the fifth casing body 112E is actually made to slide to the position of the transfer surface 118A of the output shaft section 118 over the external teeth 120A of the output gear section 120. Moreover, a state where the held rollers 162 and the recesses 112E1 are engaged with each other is shown in FIGS. 12A and 12B.

Figure 13:
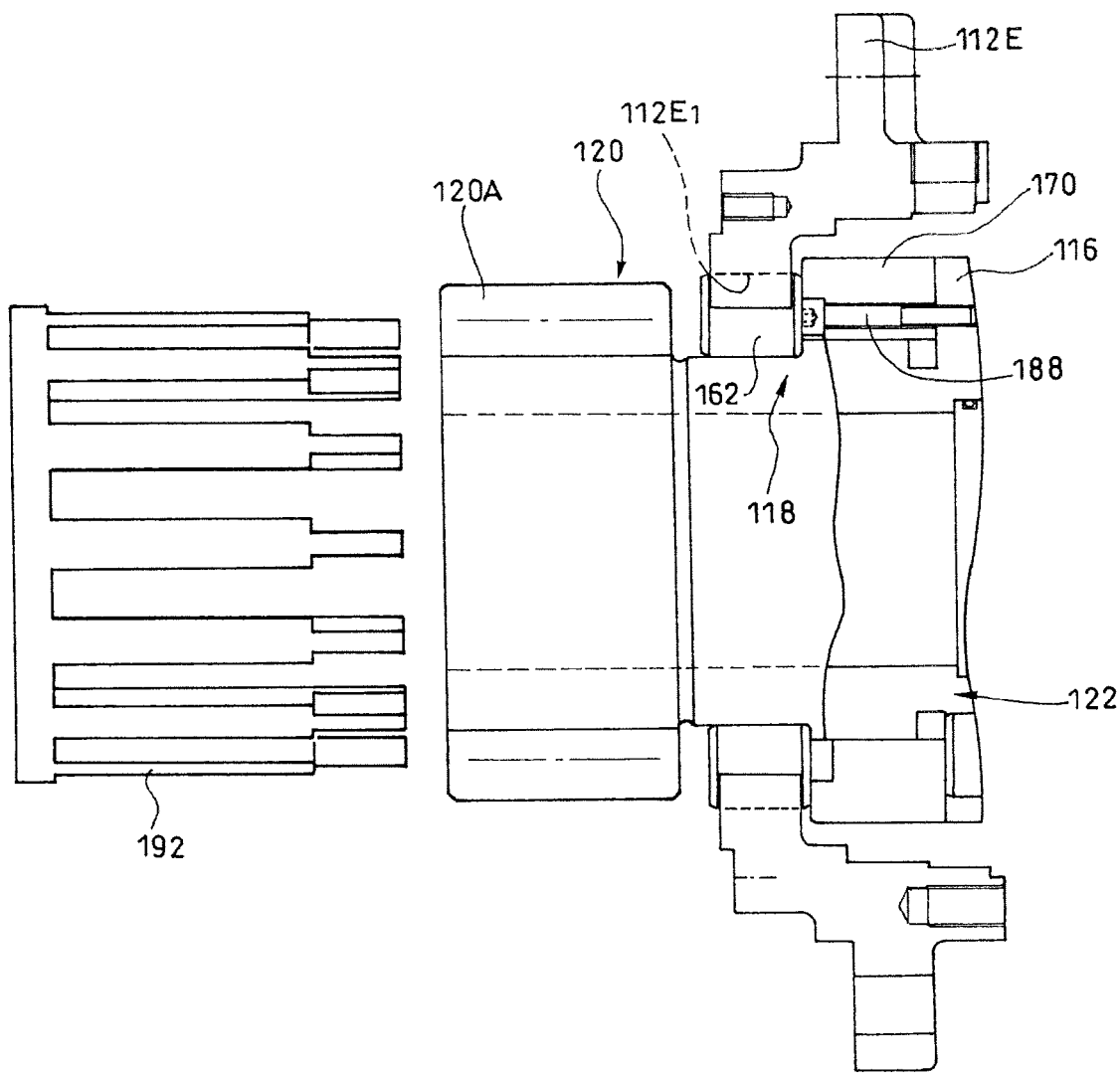
FIG. 13 is an explanatory view showing a further next step of the procedure in the above process.

At this stage, the fifth casing body 112E is connected to the fourth casing body 112D side by the bolts 129 (FIG. 1). Thereafter, the holding jig 192 is removed (refer to FIG. 13).

Figure 14:
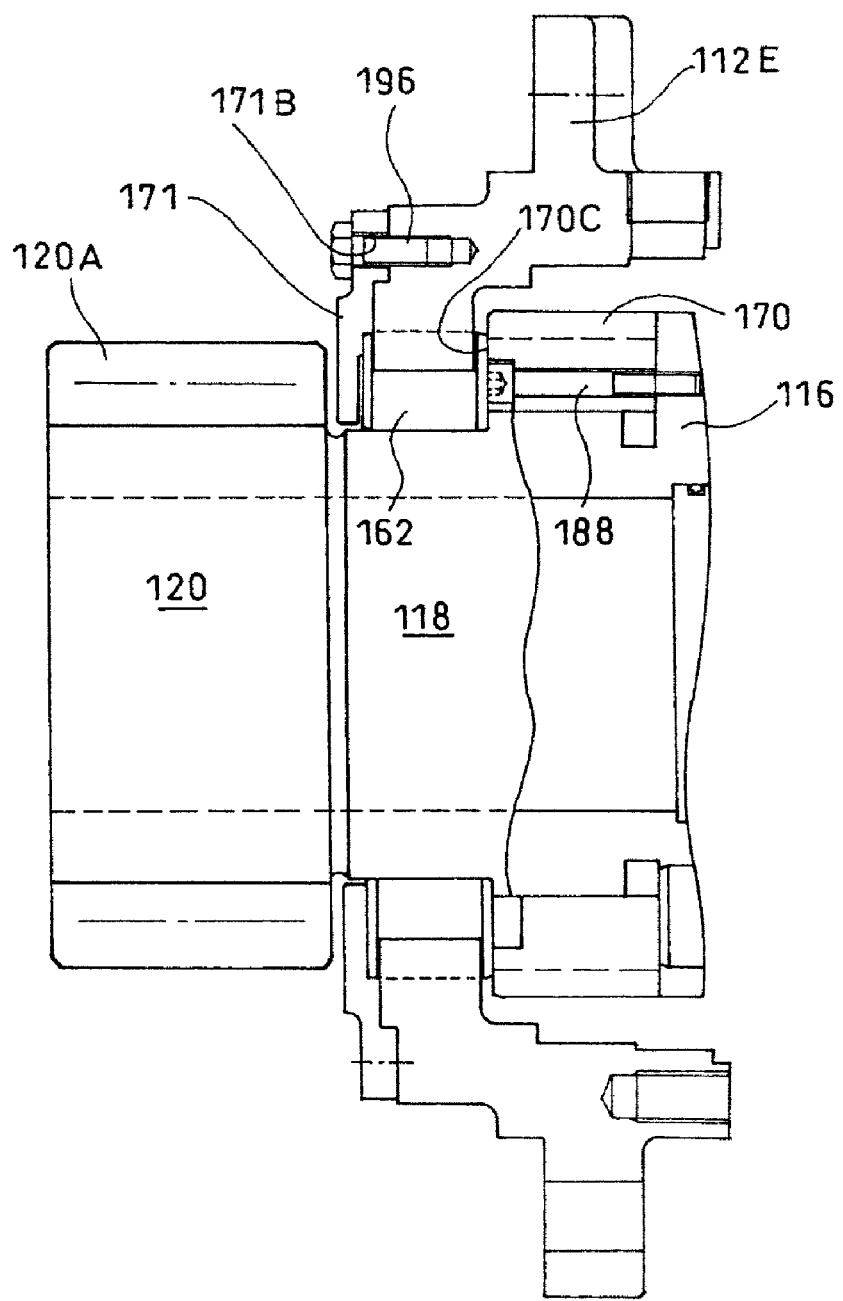
FIG. 14 is an explanatory view showing a further next step of the procedure in the above process.

Thereafter, as shown in FIG. 14, the presser plate 171 described using FIG. 8 is similarly incorporated so as to straddle the external teeth 120A of the output gear section 120 at the portions of the grooves 171A. The presser plate 171 is slightly rotated in a circumferential direction in the place where the presser plate has passed by the external teeth 120A, and is fixed to the fifth casing body 112E by the bolts 196 inserted into the bolt holes 171B such that portions other than the grooves 171A come into contact with the rollers 162. As a result, the rollers 162 are sandwiched between an end face 170C of the collar 170, and the presser plate 171, and are incorporated in a state where the axial movement thereof is regulated.

According to this embodiment, the output member 120 is constrained to the right of FIG. 1 by the ball bearing 160 of which the rightward movement is constrained by a projection 112C1 of the third casing body 112C in a state where the first to fifth casing bodies 112A to 112E are integrated together in the axial direction by the bolts 129. Additionally, the output member is constrained to the left by the presser plate 171 fixed to the fifth casing body 112E. The output member is supported at both ends thereof in the radial direction by the ball bearing 160 and the bearing means B1.

As a result, after all the output flange section 116, the output shaft section 118, and the output gear section 120 are altogether integrated as a single output member 120 with the connecting section 152 and the supporting cylindrical section 154, the axial movement and radial movement of the output member are directly constrained by a simple configuration. Therefore, it is not necessary to take a complicated configuration in which the axial movement and radial movement of respective members are separately constrained, the number of parts is small, and the assembling accuracy and assembling rigidity of the respective members can be kept very high.

Figure 15:
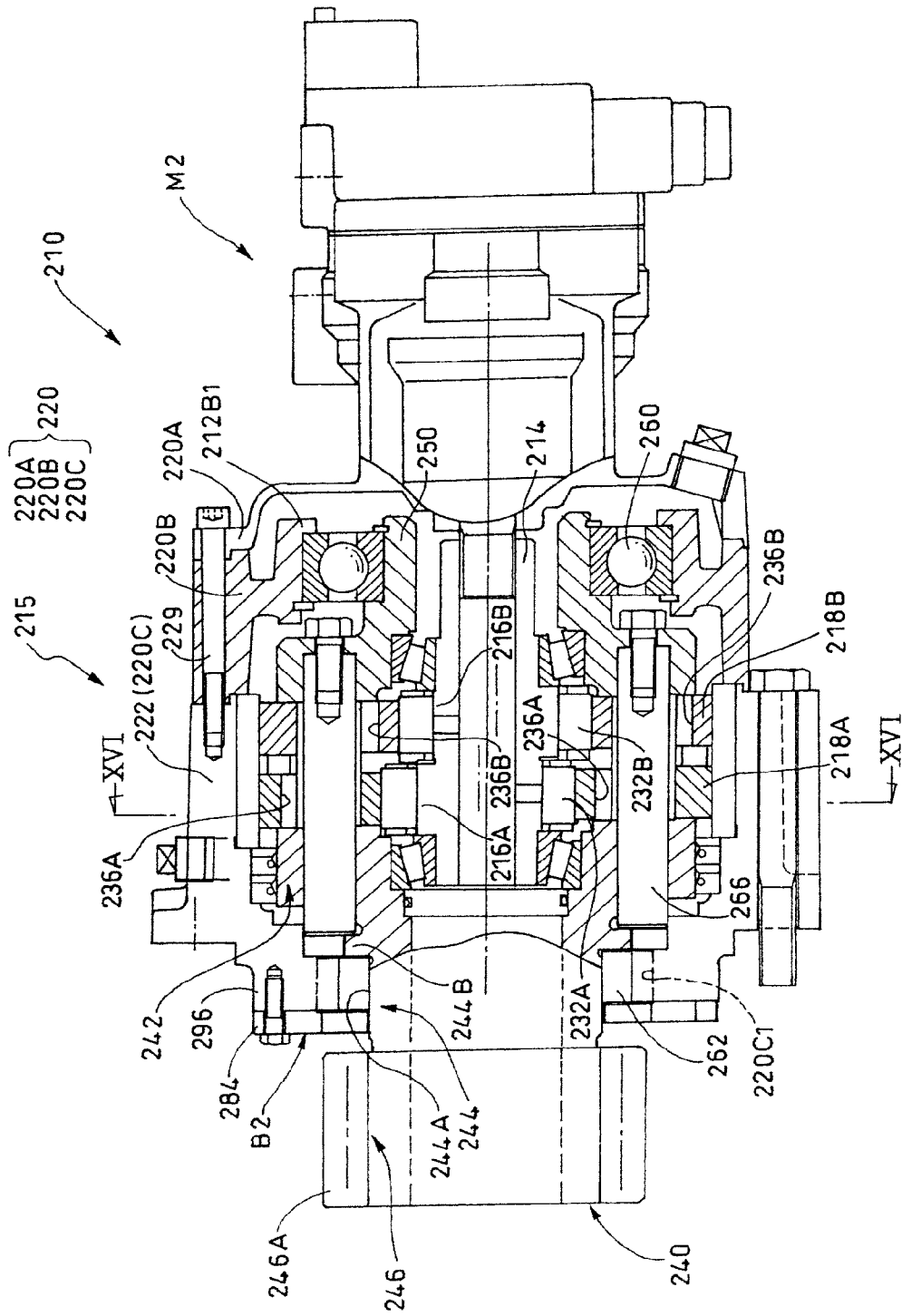
FIG. 15 is a longitudinal sectional view, equivalent to FIG. 1, of an output gear-equipped reduction device according to an example of another embodiment of the invention.
Figure 16:
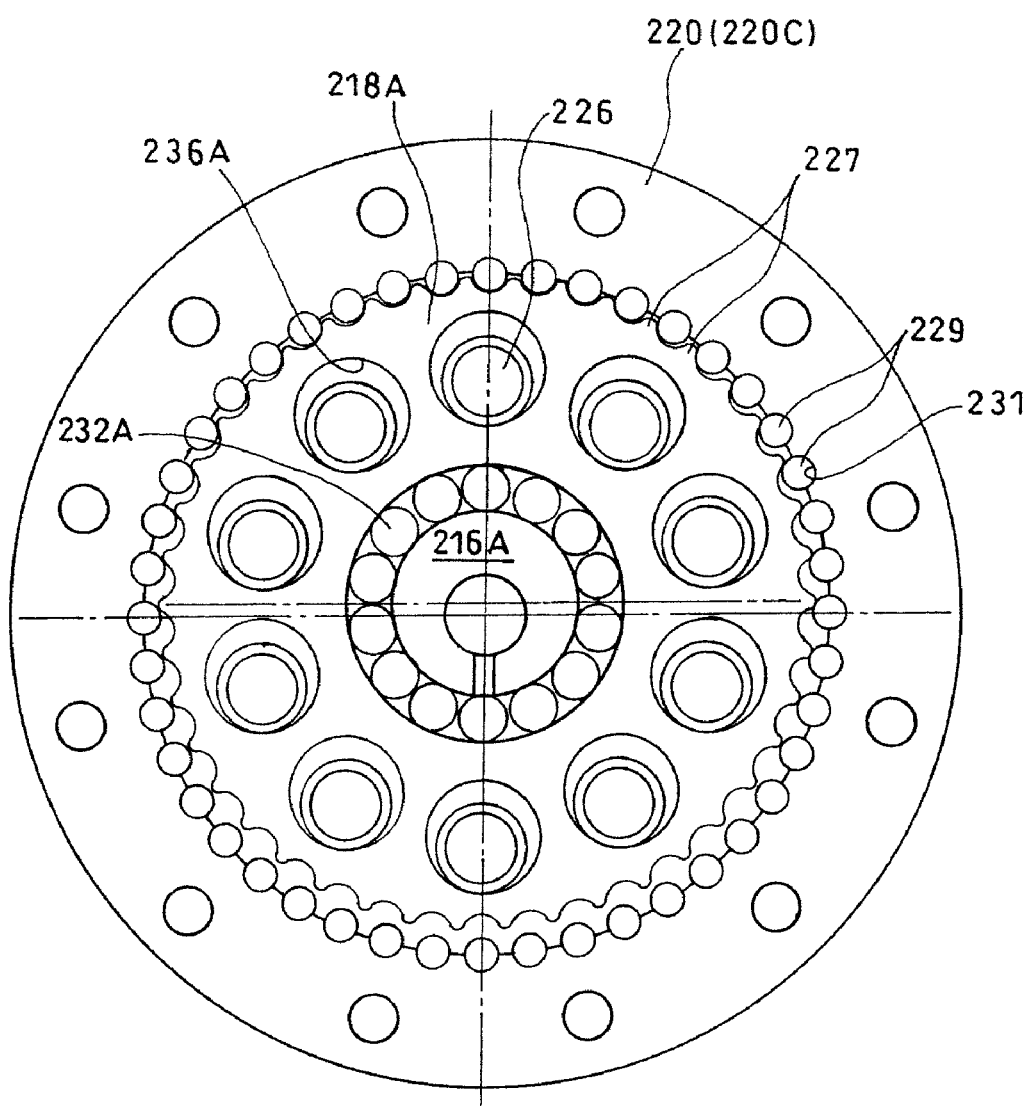
FIG. 16 is a sectional view taken along the line XVI-XVI of FIG. 15.

An example of another embodiment (second embodiment) of the invention is shown in FIGS. 15 and 16.

In this output gear-equipped reduction device 210, an oscillating internally meshing reduction mechanism 215 is connected to a motor M2. In this embodiment, a casing 220 is composed of first to third casing bodies 220A to 220C, and the third casing body 220C includes the function of the fifth casing body 112E in the previous embodiment.

This output gear-equipped reduction device 210 is configured such that external gears 218A and 218B eccentrically oscillate on the radial inside of an internal gear 222 by eccentric bodies 216A and 216B provided on eccentric shafts 214 equivalent to input shafts.

The external gears 218A and 218B are attached to the eccentric bodies 216A and 216B via rollers 232A and 232B. External teeth 227 with a trochoidal tooth profile, etc. are provided at the outer peripheries of the external gears 218A and 218B, respectively, and internally mesh with the internal gear 222. The internal gear 222 is integrated with the casing 220 (the third casing body 220C). In this embodiment, the internal teeth of the internal gear 222 has the structure in which outer pins 229 are loosely fitted into outer pin holes 231, and are held so as to rotate easily.

When the eccentric shaft 214 equivalent to an input shaft rotates, the eccentric bodies 216A and 216B rotate integrally. Although the external gears 218A and 218B also try to perform oscillating rotation around the eccentric shaft 214 by the rotation of these eccentric bodies 216A and 216B, since the rotation is regulated by the internal gear 222. Therefore, the external gears 218A and 218B basically oscillate while internally meshing with the internal gear 222.

Now, in this example, since the number of teeth of the external teeth 227 of the external gears 218A and 218B is 42, and the number of teeth (the number of the outer pins 229) of the internal teeth of the internal gear 222 is 44, the difference in number of teeth therebetween is 2. Therefore, whenever the eccentric shaft 214 makes one rotation, the external gears 218A and 218B shift (rotates) by two teeth with respect to the internal gear 222 fixed to the casing 220. This means that one rotation of the eccentric shaft 214 has been reduced to the rotation of −2/42 of the external gears 218A and 218B. In addition, the (−) sign indicates that the rotational direction is reverse.

The oscillation component of the rotation of the external gears 218A and 218B is absorbed by the gap between inner pins 226 and inner pin holes 236A and 236B, and only a rotation component is transmitted to the output flange section 242 of the output member 240 via the inner pins 226.

In this embodiment, the output member 240 integrally includes the output flange section 242, the output shaft section 244, and the output gear section 246 in that order in the axial direction with the same (the diameter of the output shaft section 244 becomes the smallest) dimensional relationship as the above embodiment, and is supported at the portion of the output shaft section 244 by the casing 220 via bearing means B2.

The output flange section 242 of the output member 240 is connected to a supporting flange 250 by the inner pins (connecting elements) 226 which pass through the inner pin holes 236A and 236B of the external gears 218A and 218B. The supporting flange 250 is supported on the second casing body 220B by a ball bearing 260. In addition, reference numeral 212B1 represents a projection provided on the second casing body 212B in order to constrain the movement of the ball bearing 260 to the right of the drawing. Additionally, the output shaft section 244 is formed with only a single transfer surface 244A and a single retaining portion 244B. The configuration of the output gear section 246 of the output member 240 is the same as that of the previous embodiment.

The bearing means B2 has the structure in which (a portion of) the output shaft section 244 of the output member 240 is used as an inner ring, a portion of the third casing body 220C equivalent to the fifth casing body 112E is used as an outer ring, and rollers 262 are used as rolling elements, and has basically the same configuration as the previous embodiment. However, in this embodiment, assembling of the rollers 262 is allowed without using the holding jig (192) by devising the positional relationship between the third casing body 220C and the output flange section 242.

Figure 17:
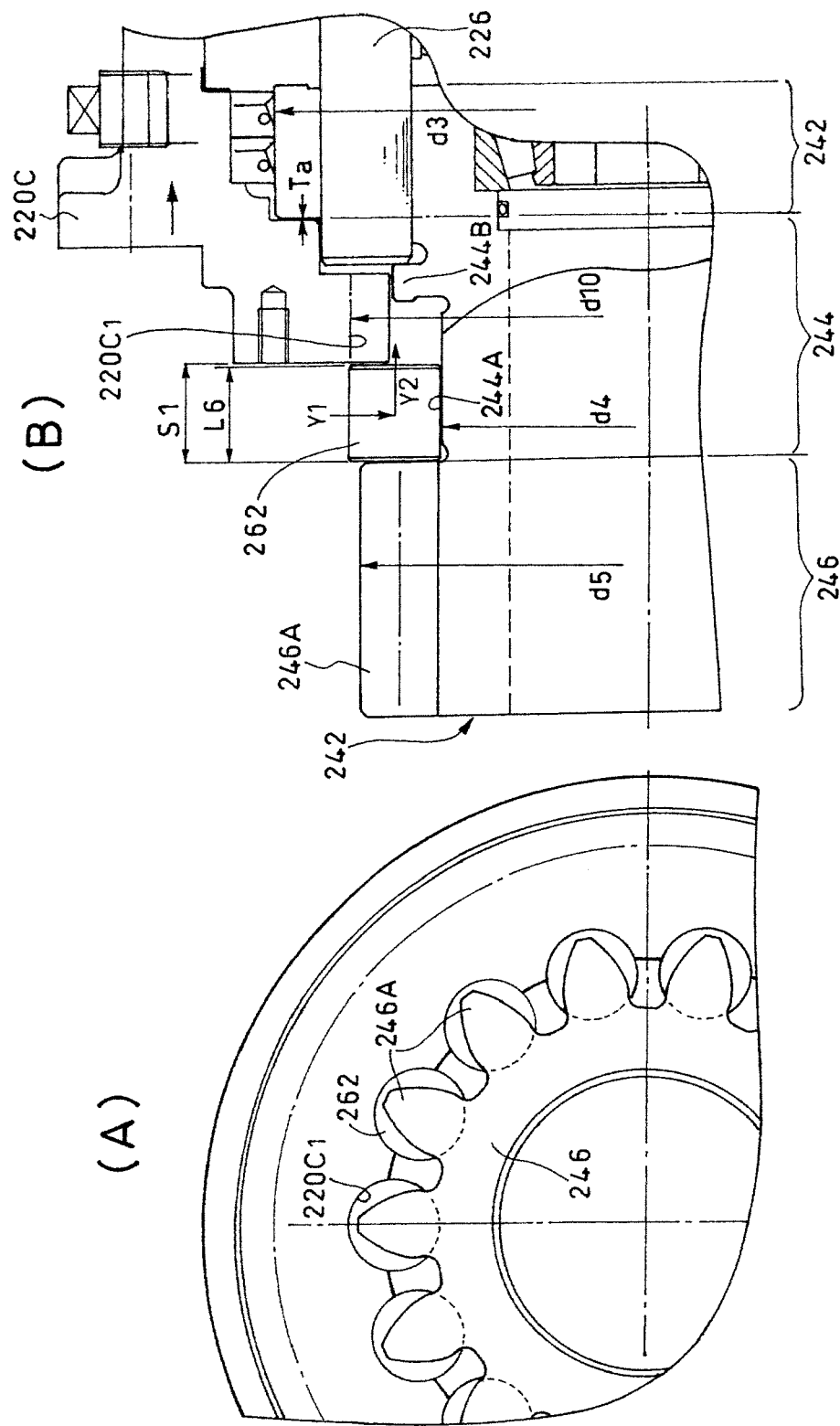
FIG. 17 is an explanatory view showing a procedure of a process of attaching an output member in the another embodiment.
Figure 18:
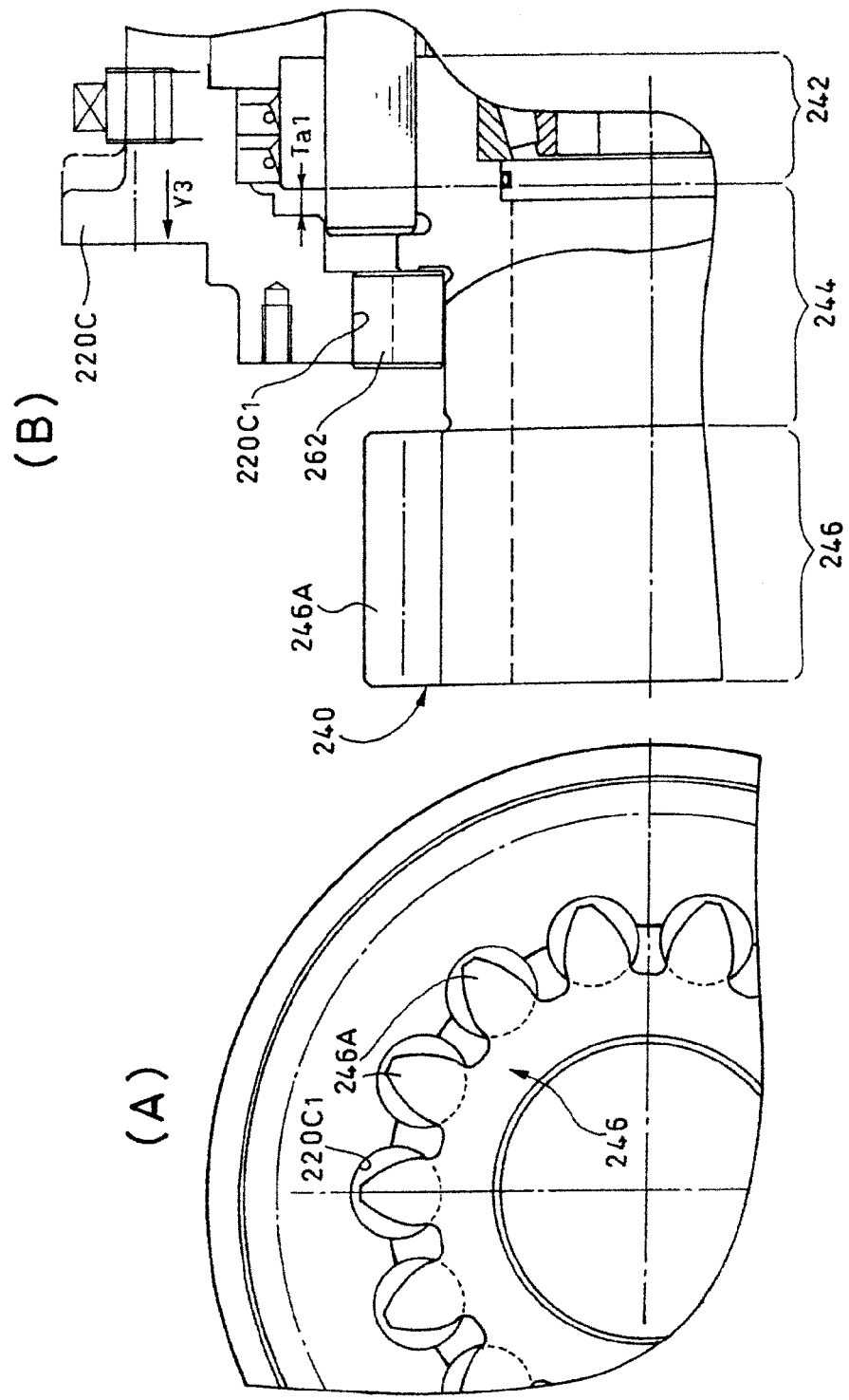
FIG. 18 is an explanatory view showing the next step of the procedure in the above process.
Figure 19:
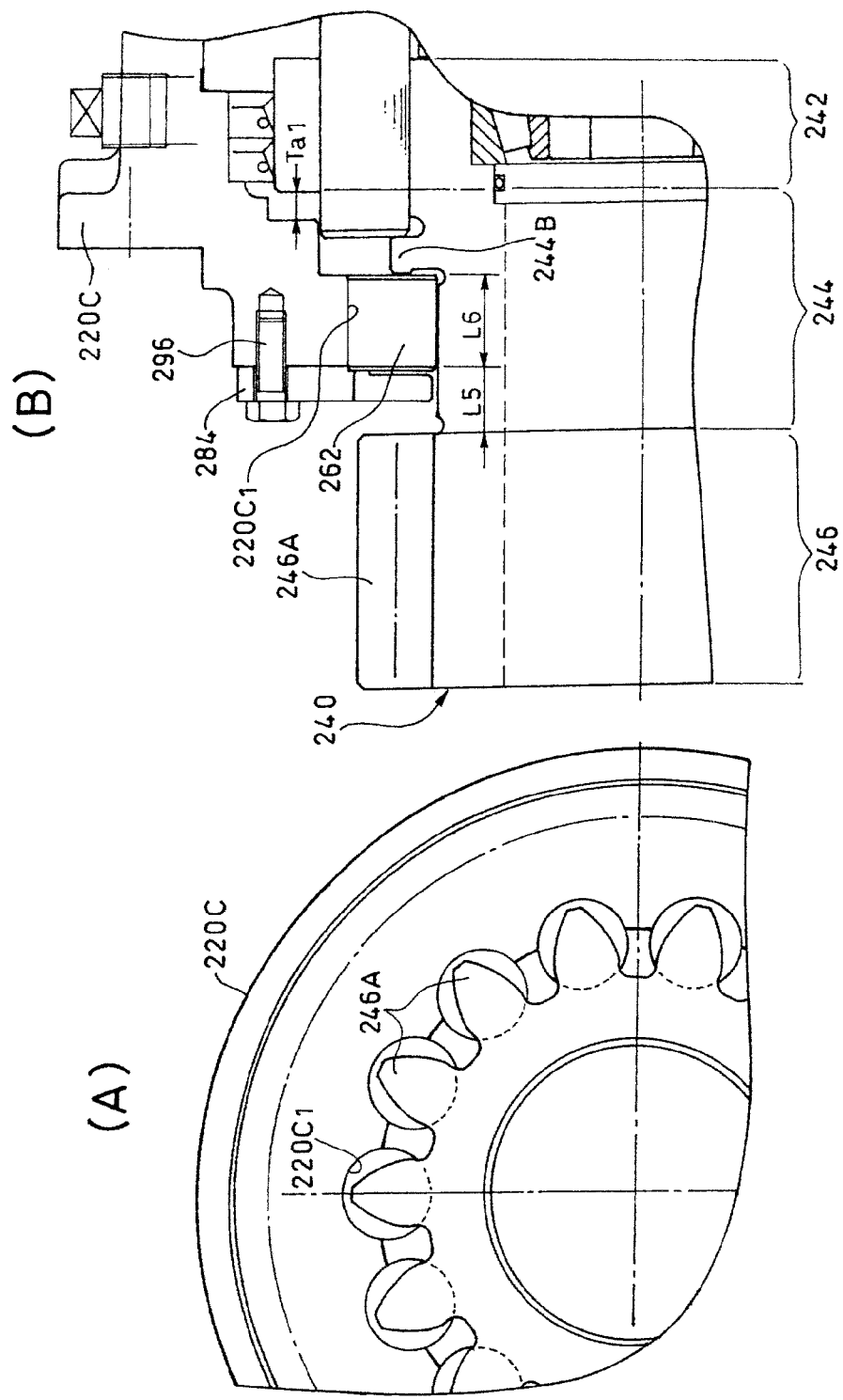
FIG. 19 is an explanatory view showing a further next step of the procedure in the above process.

That is, as shown in FIG. 17, before the third casing body 220C (equivalent to the fifth casing body 112E in the previous embodiment) is incorporated into the second casing body 220B, the third casing body 220C is first pushed until the third casing body 220C comes into contact with the output flange section 242 (refer to a portion shown by reference numeral Ta), and an axial space S1 longer than the axial length L6 of the rollers 262 is secured between the third casing body 220C and each side surface of the output gear section 246 in order to house the rollers 262 in recesses (circular-arc sliding surface) 220C1. Also, the rollers 262 are made to fit into the recesses 220C1 formed in the third casing body 220C from this axial space S1 (arrows Y1 and Y2). After the rollers 262 are made to fit into the recesses into 220C1, the third casing body 220C is moved in a direction in which a portion of the axial space S1 is eliminated, i.e., in the direction of an arrow Y3 of FIG. 18B (is moved in a relatively reverse direction) with respect to the output member 240, and is brought into the state of FIG. 18. Here, the state (=state of FIG. 15) of FIG. 19 is brought by settling the axial position of the third casing body 220C via the bolts 229 and attaching the presser plate 284 similarly to the previous embodiment. The space shown by reference numeral Ta1 in FIGS. 15 and 19 is a space resulting from this return movement.

According to this embodiment, even if a holding jig is not used, the rollers 262 can be incorporated, and the support position at the rollers 262 after the incorporation is returned to the output gear section 242 side. Therefore, the merit is obtained that the moment generated in the output gear section 246 can be made small by shortening the distance L5 between the output gear section 242 and the rollers 262 (especially by making shorter than the length L6 of the rollers 262).

An example of still another embodiment (third embodiment) is shown in FIGS. 20 to 23.

Figure 20:
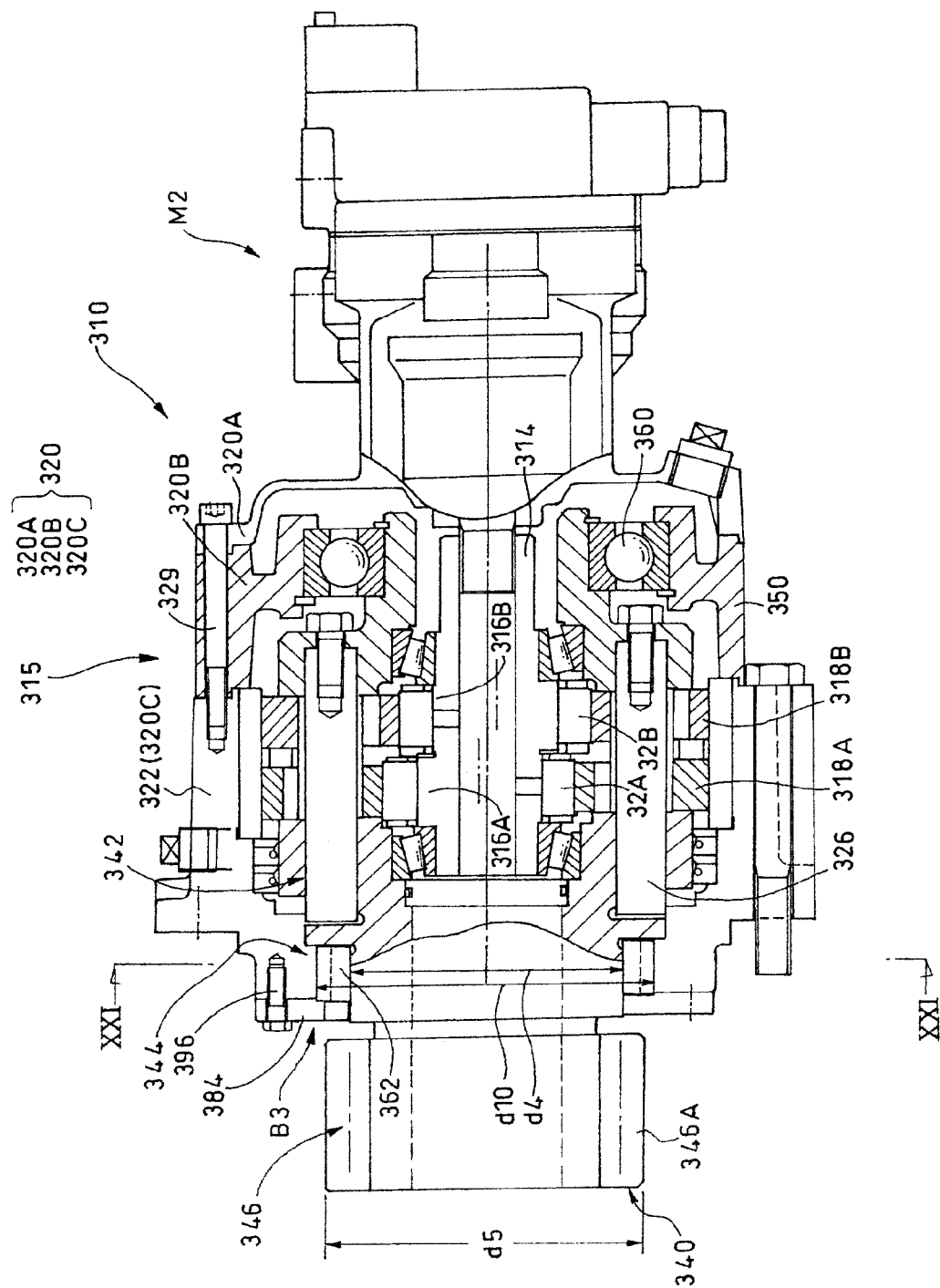
FIG. 20 is a longitudinal sectional view, equivalent to FIG. 15, of an output gear-equipped reduction device according to an example of still another embodiment of the invention.
Figure 21:
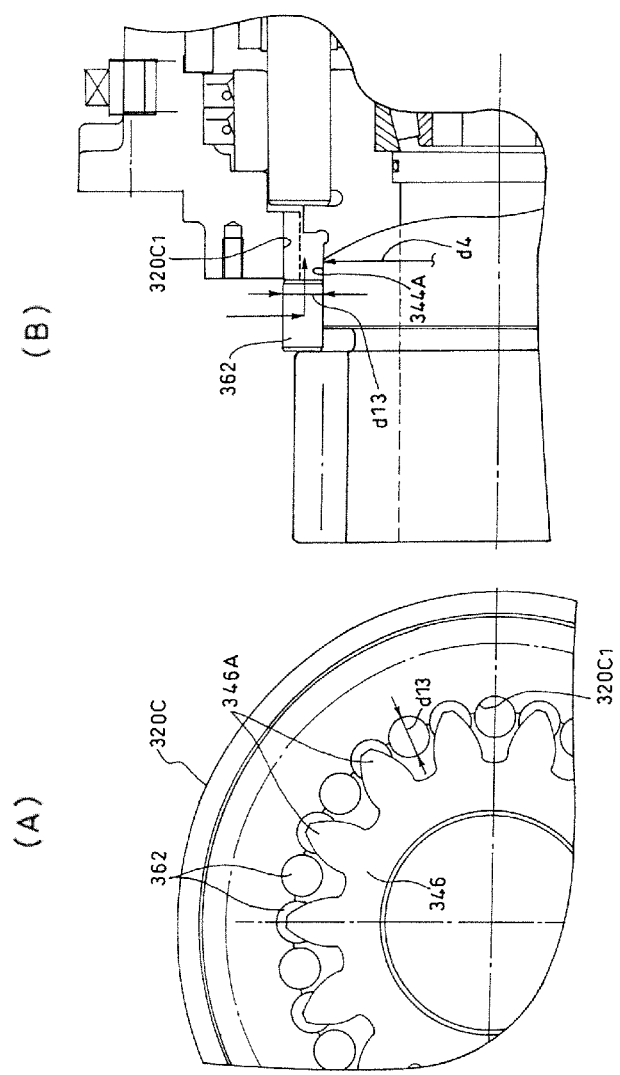
FIG. 21A is a sectional view taken along the line XXI-XXI of FIG. 20.
FIG. 21B is a sectional view of the output gear-equipped reduction device of FIG. 20.
Figure 22:
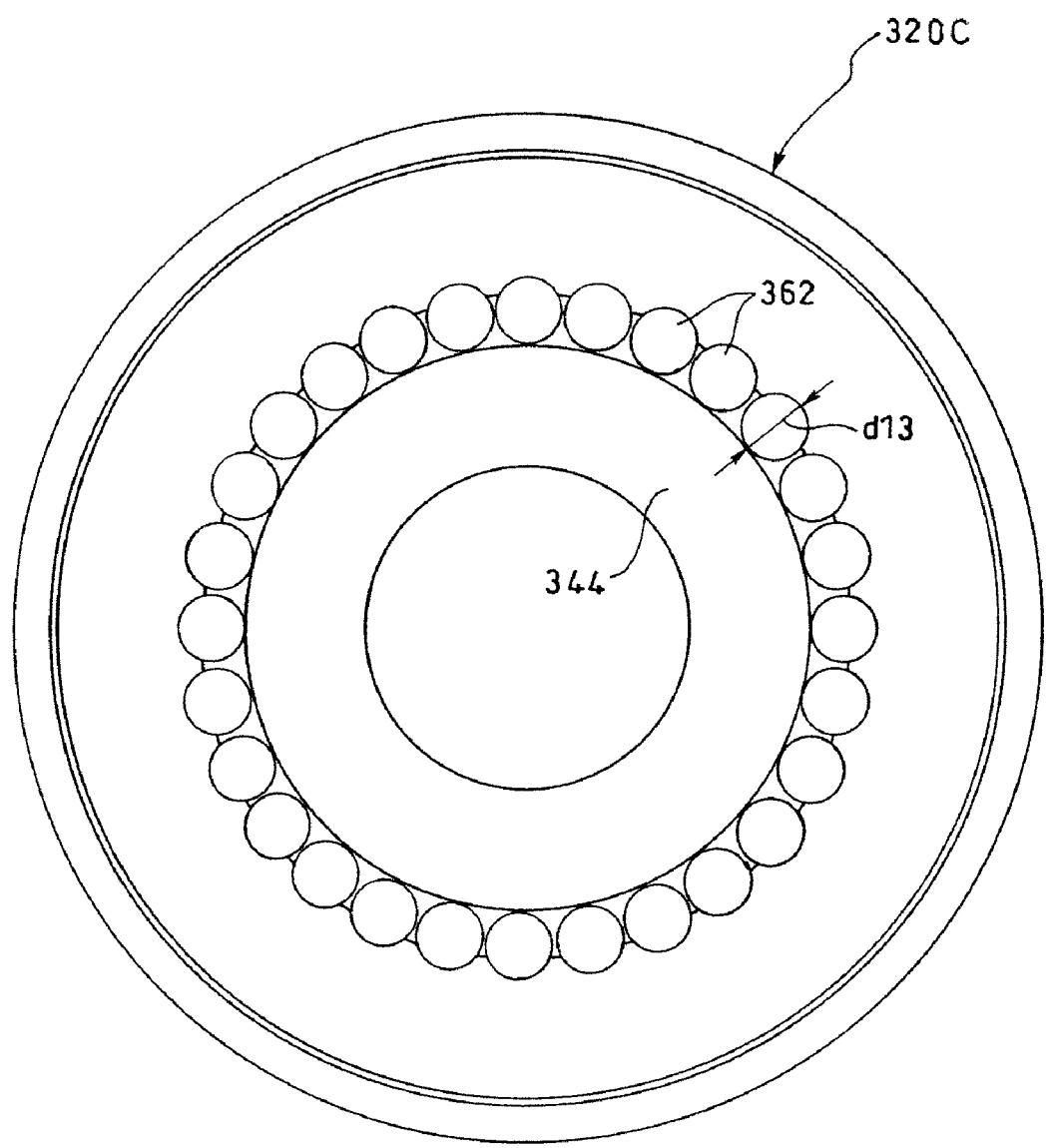
FIG. 22 is an explanatory view showing a procedure of a process of attaching an output member in the still another embodiment.

FIG. 20 corresponds to FIG. 15 in the previous second embodiment, and FIG. 21 is a sectional view taken along the line XXI-XXI of FIG. 20. Additionally, FIG. 22 is a view corresponding to FIG. 17.

A reduction mechanism 315 and an output member 340 in this output gear-equipped reduction device 310 are the same as that of the previous second embodiment. That is, the output member 340 integrally includes an output flange section 342, an output shaft section 344, and an output gear section 346 in that order in the axial direction with the same (the diameter of the output shaft 344 becomes the smallest) dimensional relationship as the two previous embodiments. This embodiment is the same as the previous embodiment in that the casing 320 is also composed of first to third casing bodies 320A to 320C, and the third casing body 320C has a function to support the bearing means B3.

Figure 23:
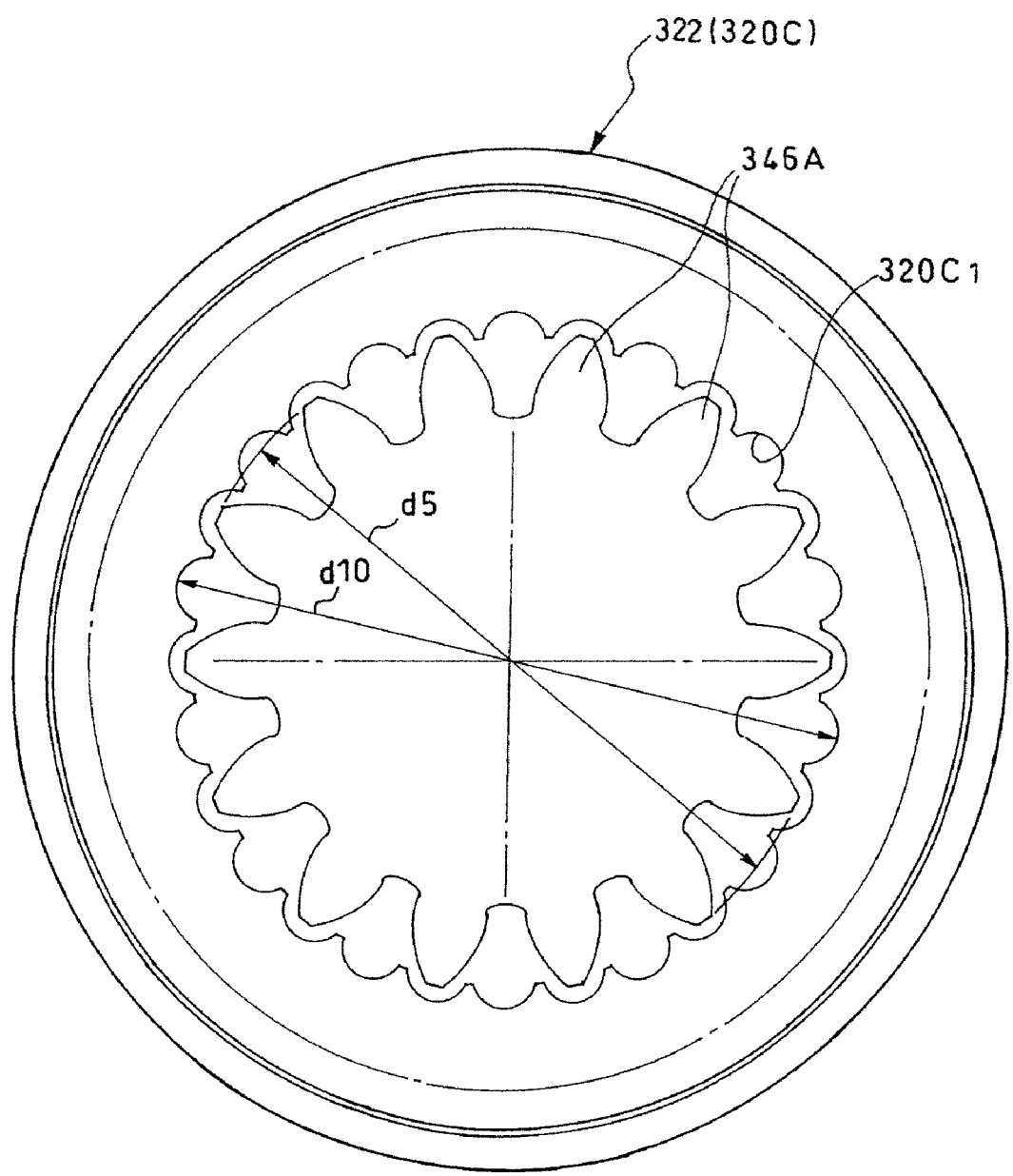
FIG. 23 is a side view showing the relationship in position and size between an output gear section of the output member and a recess of a casing in the still another embodiment.

A different configuration is that the output member 340 is supported by the casing 320 via the bearing means B3. That is, as is clear from FIGS. 21A, 21B, and 22, in this output gear-equipped reduction device 310, the number of external teeth 346A of the output gear section 346 is 14 which is the same as the previous second embodiment. However, the number of rollers 362 is set to 28, and the diameter of the rollers 362 is set to d13 (<the diameter d11 of the rollers 262). That is, the rollers 362 having a number which correspond to twice as many as the number of the external teeth 346A of the output gear section 346 are incorporated. A relationship diagram between the external teeth 346A and recesses (circular-arc transfer surface) 320C1 of the third casing body 320C, which is equivalent to FIG. 6, is shown in FIG. 23 by reference.

In this way, the number of the external teeth 346A of the output gear section 346 is not necessarily made to coincide with the number (that is, the number of the recesses 320C1) of the rollers 362, and as in this embodiment, the relationship may be established such that the number of the roller 362 becomes the integral multiple of the external teeth 346A. If this relationship is established, even if the diameter d4 of a transfer surface 344A of the output shaft section 344 is smaller than the diameter d5 of the addendum circle of the output gear section 346, it is possible to assemble the casing body 320, etc. through completely the same process as the previous embodiment so as to straddle the output gear section 346 by using the recesses (circular-arc transfer surface) 320C1 of the third casing body 320C, and it is possible to manufacture the output gear-equipped reduction device 310 according to the invention.

In addition, since other portions are the same as those of the previous second embodiment, reference numerals having the same last two digits as the reference numerals given in the second embodiment are given to portions having the same as or similar functions in the drawings, and duplicate description is omitted.

Figure 24:
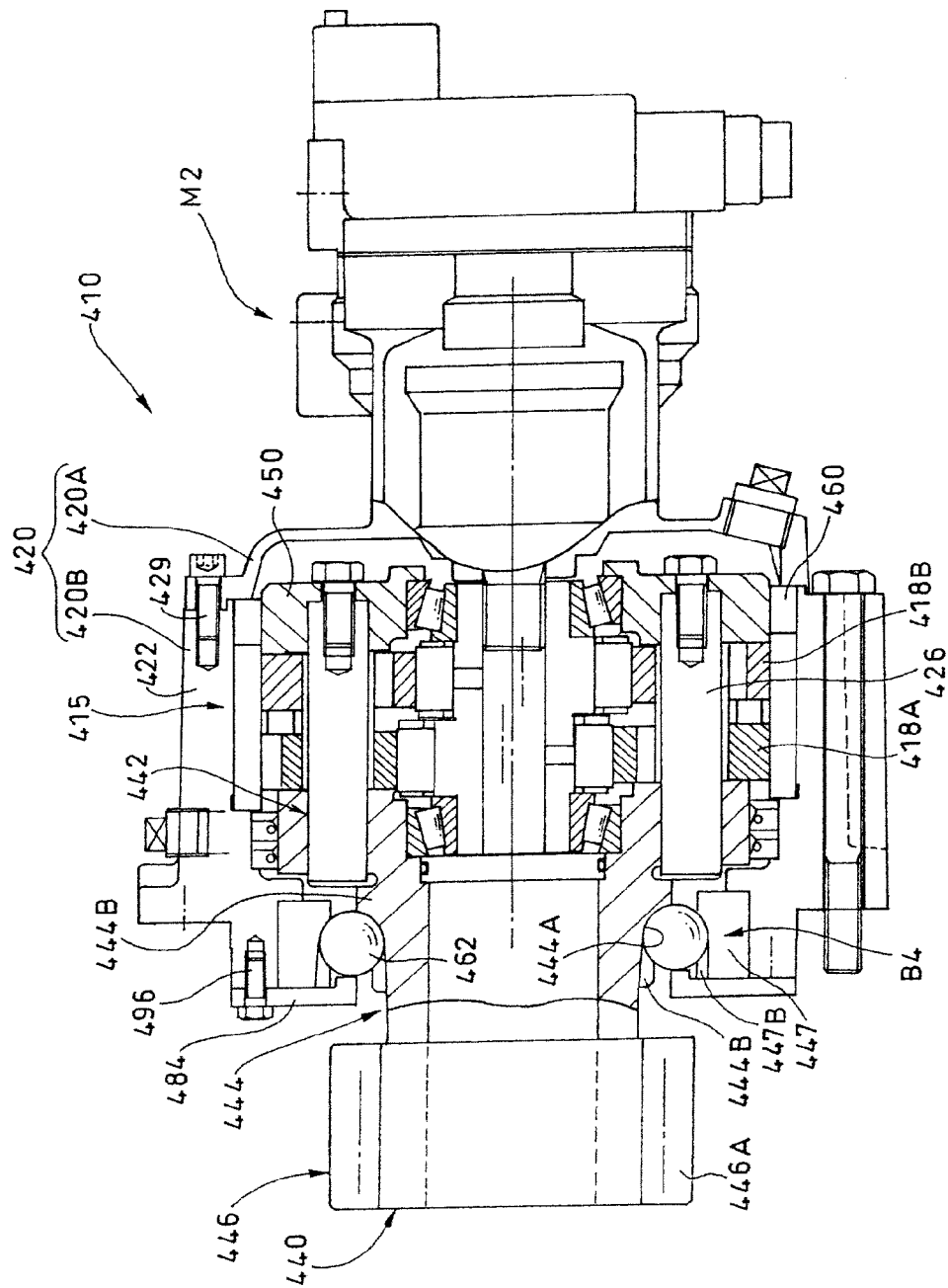
FIG. 24 is a longitudinal sectional view, equivalent to FIG. 15, of an output gear-equipped reduction device according to an example of a still further embodiment of the invention.

An example of a still further embodiment (fourth embodiment) is shown in FIG. 24.

A reduction mechanism 415 in this output gear-equipped reduction device 410 is almost the same as that of the previous third embodiment except for the point that one end of an output member 440 is supported at an outermost peripheral portion of a supporting flange 450 by a casing 420 via rollers 460. The output member 440 integrally includes an output flange section 442, an output shaft section 444, and an output gear section 446 in that order in the axial direction with the dimensional relationship (in which the diameter of the output shaft section 444 becomes the smallest), and is supported at the portion of the output shaft section 444 by the casing 420 via bearing means B4. The casing 420 is also composed of first and second casing bodies 420A and 420B, and the second casing body 420B has a function to support the bearing means B4.

Although the configuration of the output flange section 442 and output gear section 444 of the output member 440 is the same as that of the previous second and third embodiments, there is a great feature that the output shaft section 444 is formed so that its diameter increases towards a retaining portion 444B. In this embodiment, the bearing means B4 has a dedicated outer ring 447, and is configured so that balls 462 serving as rolling elements are interposed between the bearing means and the output shaft section 444 which also serves as an inner ring. This bearing structure is generally called a so-called maximum ball bearing in which grooves (insertion passages) 447B and 444B for allowing the balls 462 to be put thereinto are formed in specific points of this outer ring 447, and the transfer surface 444A of the output shaft section 444 which also serves as an inner ring, respectively so that the balls 462 can be incorporated via the grooves 447B and 444B. After the ball 462 are altogether incorporated, the balls 462 are prevented from jumping out of the grooves 447B and 444B by attaching the presser plate 484 by bolts 496.

In addition, although the presser plate 484 can be formed in a shape which has recesses (not shown) for straddling the external teeth 446A like the two previous embodiments, employment of this configuration may be difficult depending on the size or number of the balls 462. In this case, a presser plate, which is divided into two at right angles to the circumferential direction, may be used. The problem of strength does not occur at all even if the presser plate 484 is divided into two because the presser plate does not receive the torque relating to power transmission directly.

In addition, since other portions are the same as those of the previous third embodiment, reference numerals having the same last two digits as the reference numerals given in the third embodiment are given to portions having the same as or similar functions in the drawings, and duplicate description is omitted.

Figure 25:
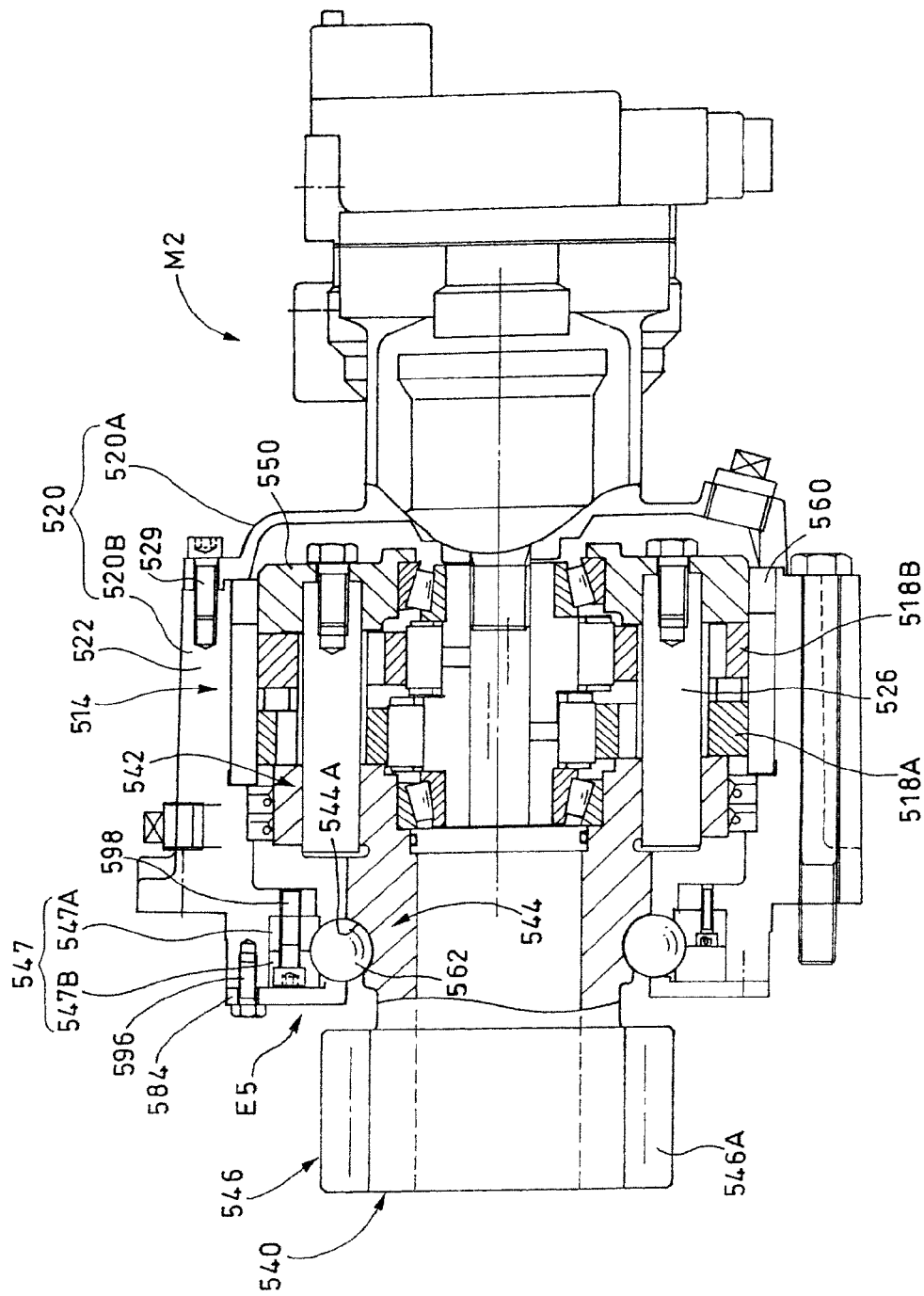
FIG. 25 is a longitudinal sectional view, equivalent to FIG. 15, of an output gear-equipped reduction device according to an example of a still further embodiment of the invention.
Figure 26:
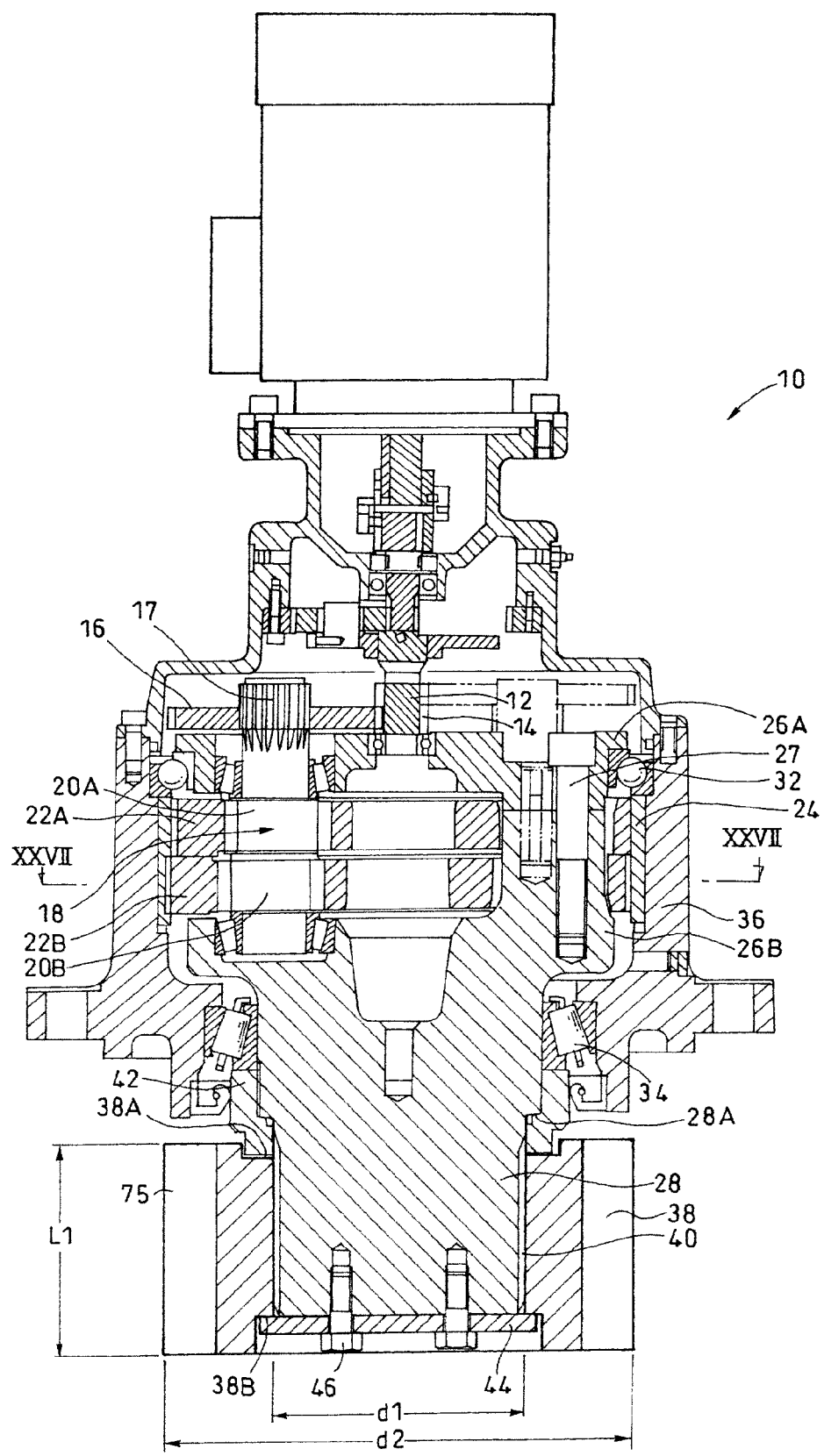
FIG. 26 is a longitudinal sectional view, equivalent to FIG. 1, showing an example of a related-art output gear-equipped reduction device.
Figure 27:
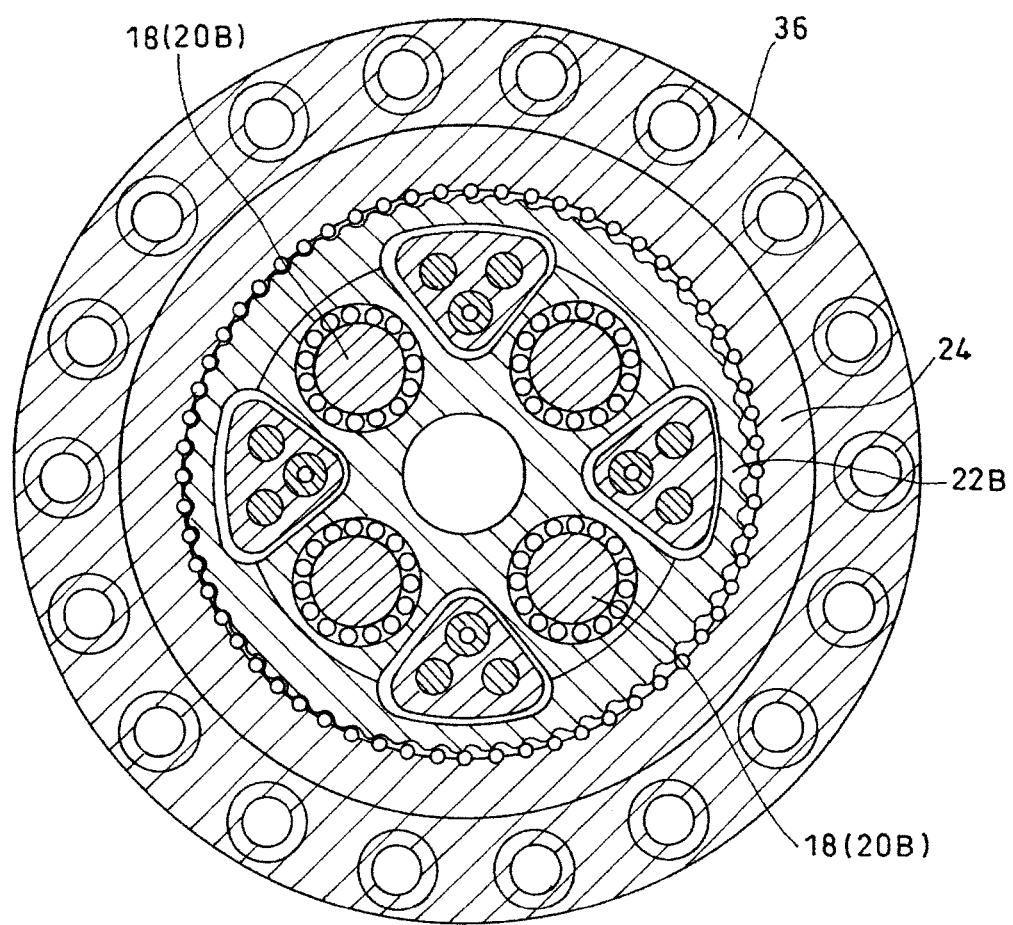
FIG. 27 is a sectional view taken along the line XXVII-XXVII of FIG. 26.

An example of a still further embodiment (fifth embodiment) is shown in FIG. 25.

In this output gear-equipped reduction device 510, this embodiment is different from the previous fourth embodiment in that, in order to configure bearing means B5, an output shaft section 544 of an output member 540 is formed with a transfer surface 544A having a circular-arc cross-section, and dedicated outer rings 547A and 547B having a divided surface perpendicular to the axial direction and divided into two are provided.

Balls 562 are incorporated in the axial direction from a slightly oblique direction in a state where the outer ring 547A on the right of FIG. 25 is mounted. The left outer ring 547B is incorporated after incorporation of the ball 562, and are fixed to a casing 520 (a second casing body 520B) by bolts 598. Although the presser plate 584 is not necessarily required in this embodiment, the presser plate is attached in order to reliably prevent falling-off of the balls 562.

In addition, since other portions are the same as those of the previous fourth embodiment, reference numerals having the same last two digits as the reference numerals given in the fourth embodiment are given to portions having the same as or similar functions in the drawings, and duplicate description is omitted.

As described above, in the invention, whether an output member is supported by a casing using a bearing means having any specific configuration is not limited to a particular configuration, and various configurations can be adopted.

Additionally, the motor is also not limited to a hydraulic motor, and may be an electric motor.

An output gear-equipped reduction device including an output flange for taking out rotation reduced by a reduction mechanism, an output shaft provided on the output flange and having a smaller diameter than the output flange, and an output gear provided on the output shaft and having an addendum circle greater than the diameter of the output shaft, and especially an output gear-equipped reduction device having such a configuration can be utilized for turning devices of construction or civil engineering machinery or turning devices for wind power generation which are standardly used.

It should be understood that the invention is not limited to the above-described embodiment, but may be modified into various forms on the basis of the invention. Additionally, the modifications are included in the scope of the invention.

I claim:

1. An output gear-equipped reduction device comprising:
a casing;
a reduction mechanism housed within the casing;
an output flange for taking out rotation reduced by the reduction mechanism;
an output shaft provided on the output flange and having a smaller diameter than the output flange; and
an output gear provided on the output shaft and having an addendum circle greater than the diameter of the output shaft,
wherein the output flange, the output shaft, and the output gear are integrally formed as an output flange section, an output shaft section, and an output gear section of a single output member in that order in the axial direction with the above-stated dimensional relationship maintained,
wherein the integral output member is supported at the output shaft section by the casing via bearing means,
wherein the casing has a plurality of recesses which house the rolling elements of the bearing means, and a retainer of the rolling elements in the circumferential direction of the output shaft section is formed between the recesses, and wherein the recesses are set to the position and size such that the teeth of the output gear section can pass through the recesses in the axial direction.

2. The output gear-equipped reduction device according to claim 1,
wherein a member which constitutes an outer ring or inner ring of the bearing means is made of a single raw material at least in the circumferential direction.

3. The output gear-equipped reduction device according to claim 1,
wherein a portion of the output shaft section functions as a transfer surface of an inner ring of rolling elements of the bearing means.

4. The output gear-equipped reduction device according to claim 1,
wherein a portion of the casing functions as a transfer surface of an outer ring of the bearing means.

5. The output gear-equipped reduction device according to claim 1,
wherein the dimension between the output flange section and the output gear section is set to a size capable of securing a greater axial space than the axial length of the rolling elements of the bearing means in cooperation with the casing during assembling.

6. The output gear-equipped reduction device according to claim 1,
wherein the number of the recesses is set to an integral multiple of the number of teeth of the output gear section.

7. The output gear-equipped reduction device according to claim 1,
wherein the bearing means has first and second outer rings, and the first and second outer rings are fixed to the casing in a state where the outer rings sandwich the rolling elements of the bearing means from the axial direction.

8. The output gear-equipped reduction device according to claim 1,
wherein the bearing means include an outer ring having insertion passages into which each of the rolling elements of the bearing means can be inserted from a specific position.

9. The output gear-equipped reduction device according to claim 1,
wherein a member which constitutes the outer ring or inner ring of the bearing means is made of a raw material divided at right angles to the circumferential direction.

10. A method of assembling an output gear-equipped reduction device including a casing, a reduction mechanism housed within the casing, an output flange for taking out rotation reduced by the reduction mechanism, an output shaft provided on the output flange and having a smaller diameter than the output flange, and an output gear provided on the output shaft and having an addendum circle greater than the diameter of the output shaft,
the method comprising:
forming an output member in which the output flange, the output shaft, and the output gear are integrally provided as an output flange section, an output shaft section, and an output gear section in that order in the axial direction with the above-stated dimensional relationship maintained;
forming an inner periphery of the casing with recesses housing rolling elements for rotationally supporting the output shaft section and set to the position and size such that the teeth of the output gear section can pass through the recesses in the axial direction;
holding the rolling elements on the outer periphery of the output shaft section; and
making the outer peripheries of the teeth of the output gear section pass through the recesses in the axial direction to incorporate the casing, and fitting the rolling elements held on the outer periphery of the output shaft section into the recesses.

11. A method of assembling an output gear-equipped reduction device including a casing, a reduction mechanism housed within the casing, an output flange for taking out rotation reduced by the reduction mechanism, an output shaft provided on the output flange and having a smaller diameter than the output flange, and an output gear provided on the output shaft and having an addendum circle greater than the diameter of the output shaft,
the method comprising:
forming an output member in which the output flange, the output shaft, and the output gear are integrally provided as an output flange section, an output shaft section, and an output gear section in that order in the axial direction with the above-stated dimensional relationship maintained;
forming an inner periphery of the casing with recesses housing rolling elements for rotationally supporting the output shaft section and set to the position and size such that the teeth of the output gear section can pass through the recesses in the axial direction;
making the outer peripheries of the teeth of the output gear section pass through the recesses in the axial direction to incorporate the casing, thereby securing an axial space between a side surface of the casing and a side surface of the output gear such that the rolling elements can be housed in the recesses; and
fitting the rolling elements into the recesses formed in the casing from the axial space.

12. The method of assembling an output gear-equipped reduction device according to claim 11, further comprising relatively moving either the output member or the casing in a direction which eliminates at least a portion of the axial space after fitting the rolling elements into the recesses formed in the casing from the axial space.

13. An output gear-equipped reduction device comprising:
a casing;
a reduction mechanism housed within the casing;
an output flange for taking out rotation reduced by the reduction mechanism;
an output shaft provided on the output flange and having a smaller diameter than the output flange; and
an output gear provided on the output shaft and having an addendum circle greater than the diameter of the output shaft,
wherein the output flange, the output shaft, and the output gear are integrally formed as an output flange section, an output shaft section, and an output gear section of a single output member in that order in the axial direction with the above-stated dimensional relationship maintained,
wherein the integral output member is supported at the output shaft section by the casing via bearing means,
wherein the casing has a plurality of recesses which house the rolling elements of the bearing means, and a retainer of the rolling elements in the circumferential direction of the output shaft section is formed between the recesses,
wherein an axial movement regulating member of the rolling elements is arranged on the output gear section side of the rolling elements, and wherein the movement regulating member has grooves formed with the position and size such that the teeth of the output gear can pass through the grooves in the axial direction.

14. The output gear-equipped reduction device according to claim 13,
wherein a member which constitutes an outer ring or inner ring of the bearing means is made of a single raw material at least in the circumferential direction.

15. The output gear-equipped reduction device according to claim 13,
wherein a portion of the output shaft section functions as a transfer surface of an inner ring of rolling elements of the bearing means.

16. The output gear-equipped reduction device according to claim 13,
wherein a portion of the casing functions as a transfer surface of an outer ring of the bearing means.

17. The output gear-equipped reduction device according to claim 13,
wherein the dimension between the output flange section and the output gear section is set to a size capable of securing a greater axial space than the axial length of the rolling elements of the bearing means in cooperation with the casing during assembling.

18. The output gear-equipped reduction device according to claim 13,
wherein the number of the recesses is set to an integral multiple of the number of teeth of the output gear section.

19. The output gear-equipped reduction device according to claim 13,
wherein the bearing means has first and second outer rings, and the first and second outer rings are fixed to the casing in a state where the outer rings sandwich the rolling elements of the bearing means from the axial direction.

20. The output gear-equipped reduction device according to claim 13,
wherein the bearing means include an outer ring having insertion passages into which each of the rolling elements of the bearing means can be inserted from a specific position.

21. The output gear-equipped reduction device according to claim 13,
wherein a member which constitutes the outer ring or inner ring of the bearing means is made of a raw material divided at right angles to the circumferential direction.

* * * * *